United States Patent [19]

Matsumoto et al.

[11] Patent Number: 5,153,766
[45] Date of Patent: Oct. 6, 1992

[54] POSTOBJECTIVE OPTICAL SCANNER

[75] Inventors: Yasuo Matsumoto; Kazunori Murakami; Tomonori Ikumi, all of Shizuoka; Yasuo Iwafune, Tokyo, all of Japan

[73] Assignee: Tokyo Electric Co., Ltd., Tokyo, Japan

[21] Appl. No.: 772,651

[22] Filed: Oct. 7, 1991

Related U.S. Application Data

[62] Division of Ser. No. 247,656, Sep. 22, 1988, Pat. No. 5,064,262.

[30] Foreign Application Priority Data

| Sep. 22, 1987 | [JP] | Japan | 62-238534 |
| Oct. 29, 1987 | [JP] | Japan | 62-274438 |
| Oct. 29, 1987 | [JP] | Japan | 62-274439 |
| Oct. 29, 1987 | [JP] | Japan | 62-274440 |
| Dec. 25, 1987 | [JP] | Japan | 62-328908 |
| Jan. 7, 1988 | [JP] | Japan | 63-001517 |

[51] Int. Cl.⁵ .................................. G02B 26/08
[52] U.S. Cl. .................................. 359/205; 359/216
[58] Field of Search .................. 359/205–206, 359/216–219

[56] References Cited

U.S. PATENT DOCUMENTS

| 3,970,359 | 7/1976 | Starkweather | 359/217 |
| 4,101,193 | 7/1978 | Waterworth et al. | 359/217 |
| 4,383,755 | 5/1983 | Fedder et al. | 359/217 |
| 4,571,035 | 2/1986 | Sakuma | 359/217 |
| 4,578,689 | 3/1986 | Spencer et al. | 346/160 |
| 4,627,685 | 12/1986 | Sakuma | 359/217 |
| 4,633,272 | 12/1986 | Hardy | 359/217 |
| 4,651,169 | 3/1987 | Muka | 359/217 |
| 4,866,459 | 9/1989 | Tokita et al. | 359/218 |
| 4,875,748 | 10/1989 | Matsumoto et al. | 359/217 |
| 4,962,981 | 10/1990 | Murakami et al. | 359/217 |
| 5,062,679 | 11/1991 | Itabashi | 359/217 |

FOREIGN PATENT DOCUMENTS

| 3309848 | 9/1983 | Fed. Rep. of Germany . |
| 3317538 | 11/1983 | Fed. Rep. of Germany . |
| 2501385 | 3/1982 | France . |
| 61-156020 | 7/1986 | Japan . |
| 61-296324 | 12/1986 | Japan . |
| 62-34119 | 2/1987 | Japan | 359/218 |
| 62-75612 | 4/1987 | Japan | 359/216 |

OTHER PUBLICATIONS

Patent Abstracts of Japan, vol. 8, No. 237 (P-310) [1674], 30th Oct. 1984; & JP-A-59 113 409 (Koparu Erekutora K.K.) Jun. 30, 1984.
Patent Abstracts of Japan, vol. 10, No. 358 (P-522) [2415], 2nd Dec. 1986; & JP-A-61 156 020 (Ricoh Co., Ltd) Jul. 15, 1986.

*Primary Examiner*—Rodney B. Bovernick
*Assistant Examiner*—James Phan
*Attorney, Agent, or Firm*—Oblon, Spivak, McClelland, Maier & Neustadt

[57] ABSTRACT

A postobjective optical scanner comprising a polygonal optical deflector having a plurality of reflecting surfaces each being a curved surface varying in curvature from position to position thereon; and a correcting lens disposed between the polygonal optical deflector and the objective surface on an optical path, and having a rotationally symmetric curved surface of incidence having a cross section having the shape of an arc of a circle with its center on the axis of rotational symmetry, rotationally symmetric with respect to a plane including the axis of rotation of the polygonal optical deflector and perpendicular to the axis of rotational symmetry and having its power in both the feed direction and the scanning direction, and a surface of departure symmetrical with respect to a plane perpendicular to the scanning direction and having its power in the scanning direction. The combined performance of the correcting effects of the polygonal optical deflector and the correcting lens corrects the curvature of image surfaces and f-θ characteristics at a high accuracy.

4 Claims, 36 Drawing Sheets

CURVE OF HIGHER ORDER
$(y = a_2 x^2 + a_4 x^4 + a_6 x^6 \ldots)$

POSTOBJECTIVE OPTICAL SCANNER

This is a division, of application Ser. No. 07/247,656, filed on Sep. 22, 1988 now U.S. Pat. No. 5,064,262.

FIELD OF THE INVENTION AND RELATED ART STATEMENT

The present invention relates to a postobjective optical scanner employing a polygonal mirror.

The conventional laser printer or the like employs a postobjective optical scanner in which light beams fall on an optical deflector after being converged by a converging lens or a preobjective optical scanner in which light beams passes a converging lens after being deflected by an optical deflector.

The preobjective optical scanner is used generally because the preobjective optical scanner is capable of easily correcting the curvature of image surface and f$\theta$ characteristics by a converging lens and capable of converging light beams on a plane. However, since the converging lens must be a wide-angle lens capable of covering an angle of deflection, the preobjective optical scanner needs an expensive converging lens having a complex construction. Accordingly, the postobjective optical scanner is employed when a converging lens having a simple construction must be used.

Although the postobjective optical scanner employs a converging lens having a simple construction, the point of convergence, in general, is on a curved surface. Accordingly, the curvature of image surface must be corrected when the postobjective optical scanner is employed.

Japanese Patent Laid-open (Kokai) No. 61-156020 discloses an postobjective optical scanner employing a polygonal mirror having a spherical or cylindrical reflecting surface to reduce the curvature of image surface. This postobjective optical scanner reduces the curvature of image surface to a practically negligible extent, however, the post objective optical scanner is unable to correct scanning nonlinearity and needs electrical means for correcting scanning nonlinearity. In a laser printer or the like, for example, a clock is varied continuously or stepwise to correct scanning nonlinearity.

OBJECT AND SUMMARY OF THE INVENTION

It is a first object of the present invention to reduce the curvature of image surface.

It is a second object of the present invention to improve the f$\theta$ characteristics.

It is a third object of the present invention to employ a polygonal deflector having reflecting surfaces having a high degree of freedom of design to achieve highly accurate correction of the curvature of image surface and f$\theta$ characteristics.

It is a fourth object of the present invention to employ a combination of a polygonal deflector and a correction lens to achieve highly accurate correction of the curvature of image surface and f$\theta$ characteristics.

According to the present invention, a postobjective optical scanner comprises: a polygonal deflector having convex curved or cylindrical reflecting surfaces for reflecting light emitted from a light source; and a correcting lens disposed between the polygonal deflector and an objective surface and having a cylindrical surface having power on the feed side or a rotationally symmetric surface having an axis of rotational symmetry parallel to the scanning direction, and a curved surface of an even degree having power on the scanning side.

Since the reflecting surfaces of the polygonal deflector are convex or cylindrical, the curvature of image surface can be corrected owing to the variation of the power of the reflecting surfaces according to the angle of deflection of light beams. The flat surface of a general cylindrical lens is replaced with a curved surface having power on the scanning side, and the other surface of the cylindrical lens is formed in a cylindrical surface or a rotationally symmetric surface having an axis of rotational symmetry parallel to the scanning direction depending on the required degree of accuracy of correction. Thus, the tilt of the polygonal deflector, as well as the curvature of image surface and f$\theta$ characteristics, can be corrected, therefore, the combination of the polygonal deflector and the correcting lens achieves highly accurate correction of the curvature of image surface and f$\theta$ characteristics.

DETAILED DESCRIPTION OF THE PREFERRED EMBODIMENTS

First Embodiment (FIGS. 1 to 14(d))

A postobjective optical scanner in a first embodiment according to the present invention comprises a polygonal optical deflector 1, and a correcting lens 3 disposed near an objective surface 2.

Figure 2:
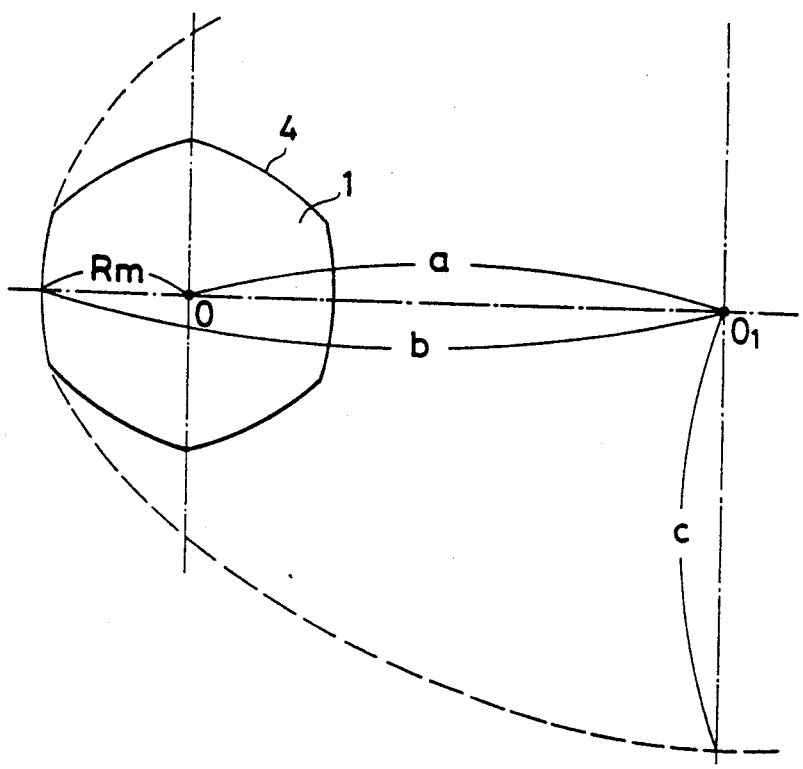
FIG. 2 is a plan view of the polygonal optical deflector of FIG. 1.
Figure 3:
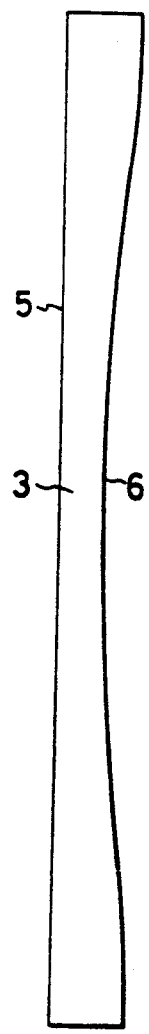
FIG. 3 is a plan view of the correcting lens of FIG. 1.
Figure 4:
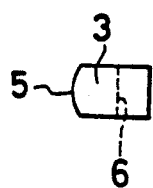
FIG. 4 is a side elevation of the correcting lens of FIG. 1.

Referring to FIG. 2, the polygonal optical deflector 1 rotates about an axis passing a point O, and has six reflecting surfaces 4 each being a portion of an elliptic cylinder having its center at a point $O_1$, a major axis of b in length, and a minor axis of c in length.

The correcting lens 3 has a cylindrical surface 5, which is similar to the cylindrical surface of an cylindrical lens, and a curved surface 6 of higher degree expressed by $1 \times 10^{-2} \times 2 - 4 \times 10^{-8} \times 4$. That is, the curved surface 6 is a curved surface of an even degree.

An axial light beam 7 and a differential light beam 8 fall on the reflecting surface 4 of the polygonal optical deflector 1 so as to converge on a point $S_0$ at a distance from the center O of the polygonal optical deflector 1. The axial light beam 7 and the differential light beam 8 reflected by the reflecting surface 4 of the polygonal optical deflector 1 travel through the correcting lens 3 and are focused on a point S.

Figure 1:
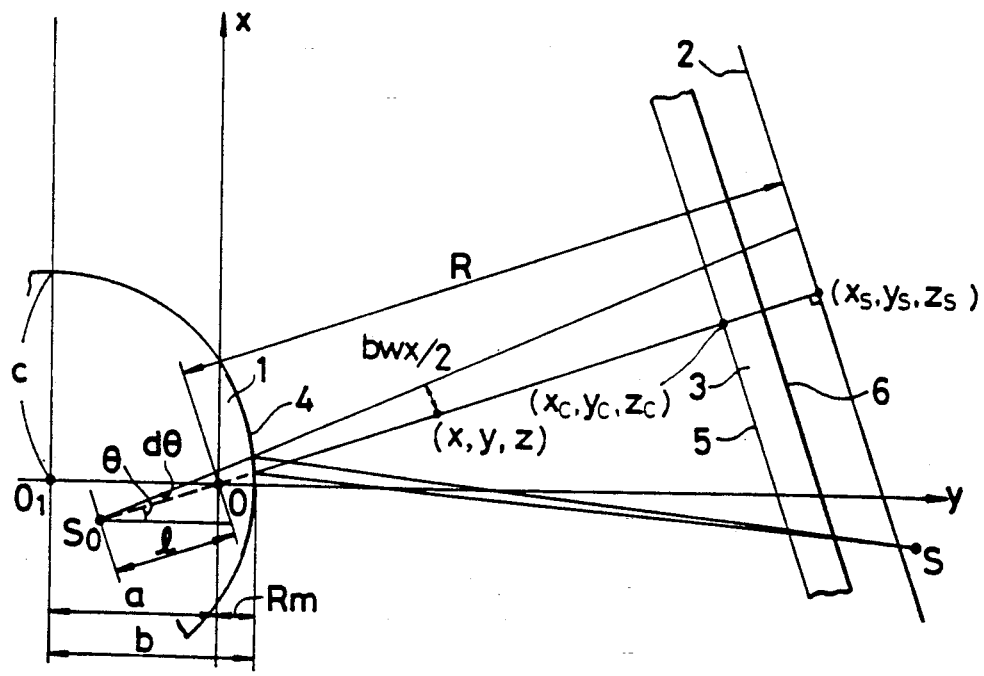
FIG. 1 is a diagrammatic illustration showing the disposition of a polygonal optical deflector and a correcting lens employed in a postobjective optical scanner in a first embodiment according to the present invention with respect to an objective surface.

Parameters shown in FIG. 1 will be described hereinafter. The polygonal optical deflector 1 has the axis of rotation passing the center O perpendicularly to a plane swept by a scanning beam. In FIG. 1, Rm is the radius of the inscribed circle of the polygonal optical deflector 1, R is the distance between the center O and the objective surface 2, $L_0$ is an effective scanning distance, not shown, θ is the phase of the polygonal optical deflector 1, and y is the position of a scanning spot on the objective surface 2. When the major axis of the elliptic cross section of the elliptic cylinder defining one of the reflecting surfaces 4 of the polygonal optical deflector 1 extends toward the objective surface 2, the phase θ=0. When $y = L_0/2$. the phase $\theta = \theta_0$. The polygonal optical deflector turns through an angle of 60° for one scanning cycle. The parameters, namely, the distance R, the coefficients of x to the second power and x to the fourth power of the function defining the curved surface of higher degree forming the curved surface 6, the thickness of the correcting lens 3, and the position of the correcting lens 3, were varied properly to optimize the curvature of scanning line, the curvature of image surface in the scanning direction, the curvature of image surface in the feed direction and f$\theta$ characteristics. Examples and measured results will be described hereinafter.

EXAMPLE 1

| Polygonal Optical Deflector | |
|---|---|
| Rm (mm) | 22.65625 |
| b (mm) | 264.96875 |
| c (mm) ($\theta = 0$) | 105.908431 |
| Point of departure (x, y, z) (mm) ($\theta = 0$) | (0, 100, −5) |
| Size of beam at point of departure (mm) | $b_{wx} = 5, b_{wz} = 1$ |
| l (mm) | 2.78582442 |
| Correcting Lens | |
| Refractive index | 1.5 |
| Radius (mm) | 20.8610004 |
| Thickness (center) (mm) | 10 |
| Coefficient of x to the second power | 0.001 (mm$^{-1}$) |
| Coefficient of x to the fourth power | −0.00000004 (mm$^{-3}$) |
| Vertex ($x_c$, $y_c$, $z_c$) (mm) ($\theta = 0$) | (0, 300, 17.92929292) |
| Objective Surface Center ($x_s$, $y_s$, $z_s$) (mm) ($\theta = 0$) | (0, 352.315818, 21.3113256) |
| Effective Scanning distance (mm) | 220 |
| Available Angular Range of Reflecting Surface (deg) | 40 |

Figure 5:
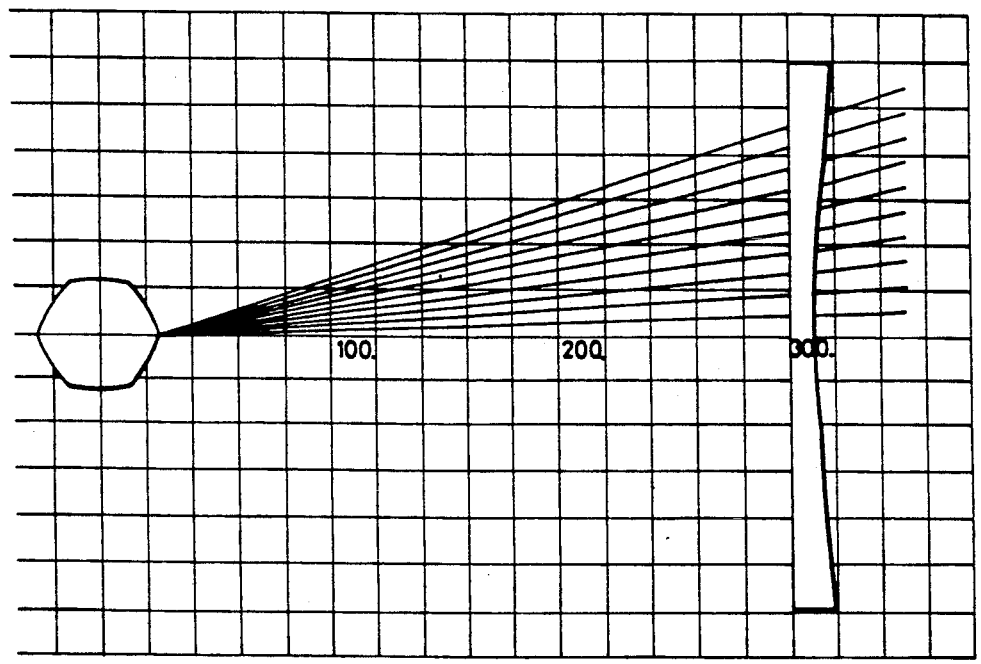
FIG. 5 is a diagram showing light beams as viewed along the z-axis of an Example 1 of the postobjective optical scanner in the first embodiment.

Results of the simulation are shown in FIGS. 5 (light beams as viewed along the x-axis), 6 (light beams as viewed along the z-axis), 7(a) (curvature of scanning line), 7(b) (curvature of image surface in the feed direction), 7(c) (curvature of image surface in the scanning direction) and 7(d) (f$\theta$ error). The maximum curvature of scanning line was −4.52×10$^{-2}$ mm, the maximum dislocation of image surface in the feed direction was −3.083 mm, the maximum dislocation of image surface in the scanning direction was −1.524 mm, and the maximum f$\theta$ error was −4.752×10$^{-2}$ mm.

EXAMPLE 2

| Polygonal Optical Deflector | |
|---|---|
| Rm (mm) | 25 |
| b (mm) | 2000 |
| c (mm) | 332.925123 |
| Point of departure (x, y, z) (mm) ($\theta = 0$) | (0, 100, −5) |
| Size of beam at point of incidence (mm) | $b_{wx} = 5, b_{wz} = 1$ |
| l (mm) | −0.03125 |
| Correcting Lens | |
| Refractive index | 1.5 |
| Radius (mm) | 17.1405558 |
| Thickness (center) (mm) | 10 |
| Coefficient of x to the second power | 0.0024375 (mm$^{-1}$) |
| Coefficient of x to the fourth power | 0 |
| Vertex ($x_c$, $y_c$, $z_c$) (mm) ($\theta = 0$) | (0, 249.625, 14.975) |
| Objective Surface Center ($x_s$, $y_s$, $z_s$) (mm) ($\theta = 0$) | (0, 293.300425, 17.886695) |
| Effective Scanning distance (mm) | 220 |
| Available Angular Range of Reflecting Surface (deg) | 40 |

Figure 6:
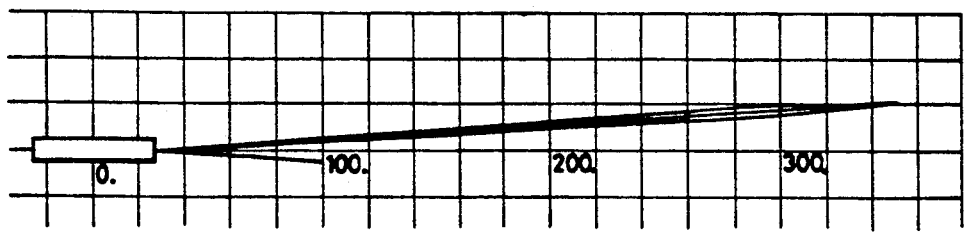
FIG. 6 is a diagram showing light beams as viewed along the x-axis of the Example 1 of the postobjective optical scanner in the first embodiment.
Figure 7A:
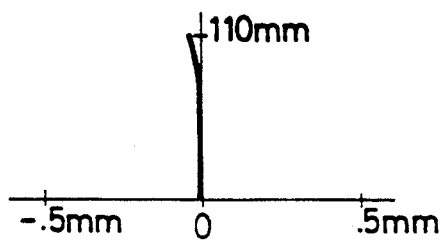
FIGS. 7(a) to 7(d) are graphs showing the respective measured data of the curvature of scanning line, the dislocation of image surface in the feed direction, the dislocation of image surface in the scanning direction, and f$\theta$ error in an Example 1 of the first embodiment.
Figure 7B:
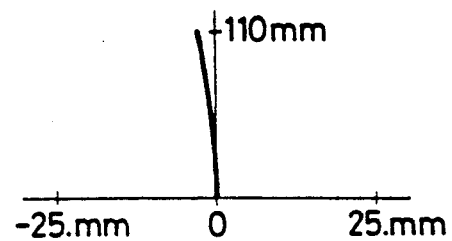
Figure 7C:
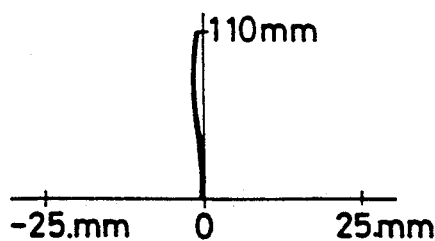
Figure 7D:
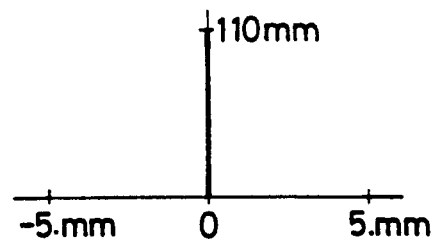
Figure 8A:
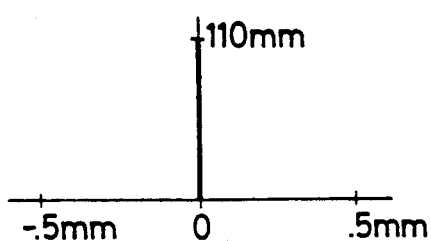
FIGS. 8(a) to 8(d), 9(a) to 9(d), 10(a) to 10(d), 11(a) to 11(d), 12(a) to 12(d) and 13(a) to 13(d) are graphs showing the respective measured data of the curvature of scanning line, the dislocation of image surface in the feed direction, the dislocation of image surface in the scanning direction and f$\theta$ error in Examples 2 to 7 of the first embodiment, respectively.
Figure 8B:
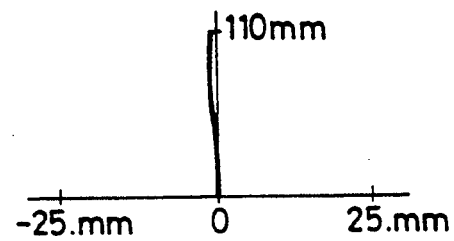
Figure 8C:
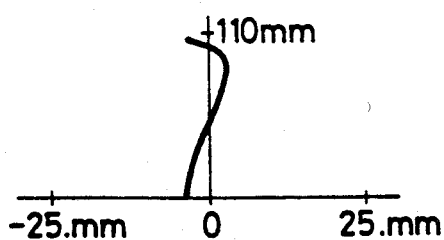
Figure 8D:
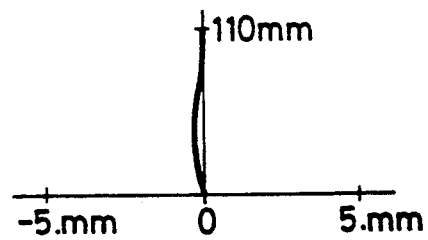

The paths of the light beams are similar to those shown in FIGS. 5 and 6. Results of simulation are shown in FIGS. 8(a) to 8(d) corresponding to FIGS. 7(a) to 7(d), respectively.

The maximum curvature of scanning line was −6.425 μm, the maximum dislocation of image surface in the feed direction was −0.9797 mm, the maximum dislocation of image surface in the scanning direction with −3.936 mm, and the maximum f$\theta$ error was −0.2996 mm.

EXAMPLE 3

| Polygonal Optical Deflector | |
|---|---|
| Rm (mm) | 25 |
| b (mm) | 2000 |
| c (mm) | 332.925123 |
| Point of departure (x, y, z) (mm) ($\theta = 0$) | (0, 100, −5) |
| Size of beam at point of departure (mm) | $b_{wx} = 5, b_{wz} = 1$ |
| l (mm) | 0 |
| Correcting Lens | |
| Refractive index | 1.5 |
| Radius (mm) | 19.8623492 |
| Thickness (center) | 10 |
| Coefficient of x to the second power | 0.002375 (mm$^{-1}$) |
| Coefficient of x to the fourth power | −3.59375 × 10$^{-8}$ (mm$^{-3}$) |
| Vertex ($x_c$, $y_c$, $z_c$) (mm) ($\theta = 0$) | (0, 239.28125, 14.2854167) |
| Objective Surface Center ($x_s$, $y_s$, $z_s$) (mm) ($\theta = 0$) | (0, 291.239725, 17.749315) |
| Effective Scanning distance (mm) | 220 |
| Available Angular Range of Reflecting Surface (deg) | 40 |

Figure 9A:
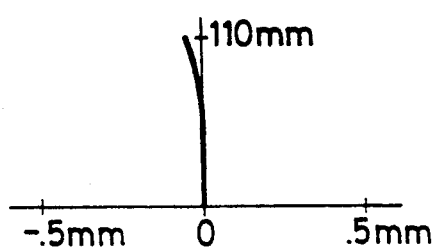
Figure 9B:
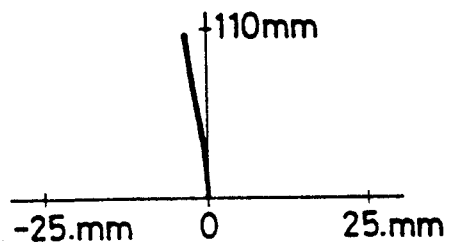
Figure 9C:
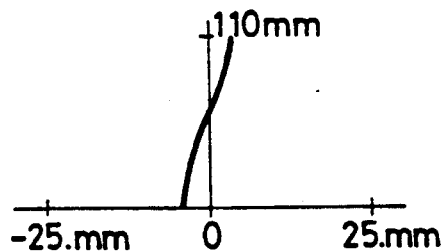
Figure 9D:
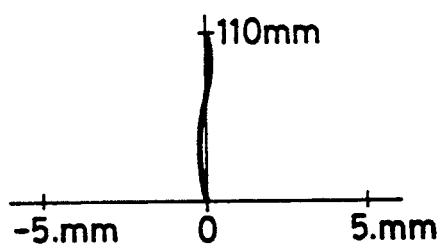

Results of the simulation are shown in FIG. 9(a) (curvature of scanning line), 9(b) (curvature of image surface in the feed direction), 9(c) (curvature of image surface in the scanning direction) and 9(d) (f$\theta$ error). The maximum curvature of scanning line was −5.6697×10$^{-2}$ mm, the maximum dislocation of image surface in the feed direction was −3.1609 mm, the maximum dislocation of image surface in the scanning direction was −4.0604 mm, the maximum f$\theta$ error was 0.18163 mm.

EXAMPLE 4

| Polygonal Optical Deflector | |
|---|---|
| Rm (mm) | 25 |
| b (mm) | 2000 |
| c (mm) | 383.035349 |
| Point of departure (x, y, z) (mm) ($\theta = 0$) | (0, 100, −5) |
| Size of beam at point of departure (mm) | $b_{wx} = 5, b_{wz} = 1$ |
| l (mm) | −6.2125 |
| Correcting Lens | |
| Refractive index | 1.5 |
| Radius (mm) | 18.32461341 |
| Thickness (center) (mm) | 10 |
| Coefficient of x to the second power | 0.0029 (mm$^{-1}$) |
| Coefficient of x to the fourth power | −6.25 × 10$^{-8}$ (mm$^{-3}$) |
| Vertex ($x_c$, $y_c$, $z_c$) (mm) ($\theta = 0$) | (0, 193.25, 11.2166667) |
| Objective Surface Center ($x_s$, $y_s$, $z_s$) (mm) ($\theta = 0$) | (0, 243.369081, 14.5579387) |
| Effective Scanning distance (mm) | 220 |
| Available Angular Range of Reflecting Surface (deg) | 40 |

Figure 10A:
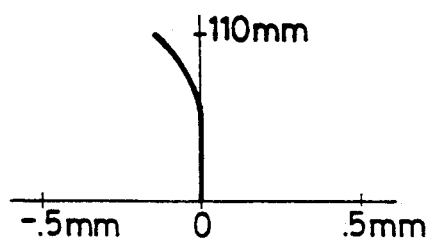
Figure 10B:
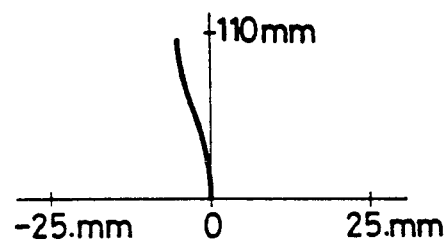
Figure 10C:
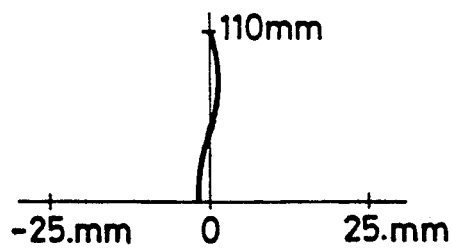
Figure 10D:
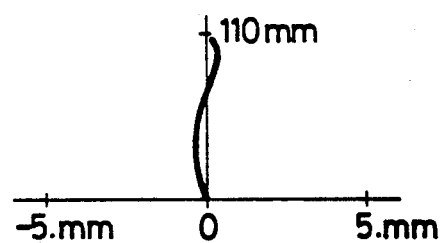

Results of the simulation are shown in FIGS. 10(a) (curvature of scanning line), 10(b) (curvature of image surface in the feed direction), 10(c) (curvature of image surface in the scanning direction), and 10(d) (f$\theta$ error). The maximum curvature of scanning line was −0.1452 mm, the maximum dislocation of image surface in the feed direction was −5.048 mm, the maximum dislocation of image surface in the scanning direction was 1.823 mm, and the maximum f$\theta$ error was 0.4364 mm.

EXAMPLE 5

| Polygonal Optical Deflector | |
| --- | --- |
| Rm (mm) | 25 |
| b (mm) | 2000 |
| c (mm) | 383.035349 |
| Point of departure (x, y, z) (mm) ($\theta = 0$) | (0, 100, −5) |
| Size of beam at point of departure (mm) | $b_{wx} = 5, b_{wz} = 1$ |
| l (mm) | −6.146875 |
| Correcting Lens | |
| Refractive index | 1.5 |
| Radius (mm) | 21.0798787 |
| Thickness (center) (mm) | 10 |
| Coefficient of x to the second power | $2.4453125 \times 10^{-3}$ (mm$^{-1}$) |
| Coefficient of x to the fourth power | $-8.59375 \times 10^{-8}$ (mm$^{-3}$) |
| Vertex ($x_c, y_c, z_c$) (mm) ($\theta = 0$) | (0, 182.8125, 10.5208333) |
| Objective Surface Center ($x_s, y_s, z_s$) (mm) ($\theta = 0$) | (0, 243.493294, 14.5662196) |
| Effective Scanning distance (mm) | 220 |
| Available Angular Range of Reflecting Surface (deg) | 40 |

Figure 11A:
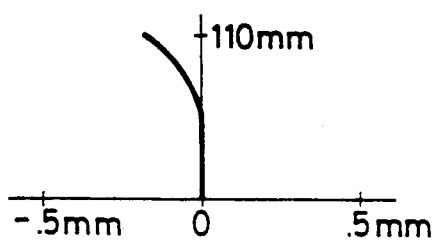
Figure 11B:
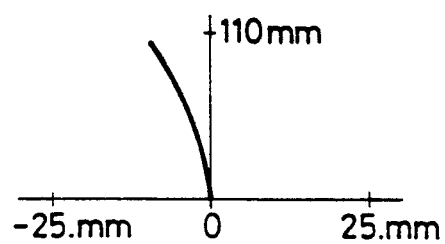
Figure 11C:
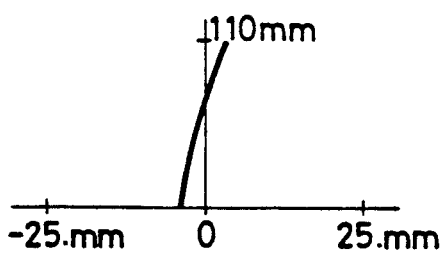
Figure 11D:
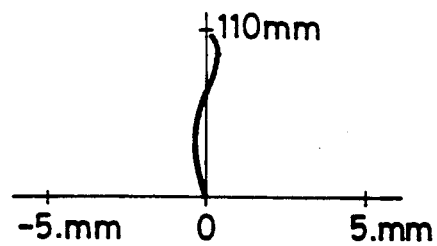

Results of the simulation are shown in FIGS. 11(a) (curvature of scanning line), 11(b) (curvature of image surface in the feed direction), 11(c) (curvature of image surface in the scanning direction) and 11(d) (f$\theta$ error). The maximum curvature of scanning line was −0.1855 mm, the maximum dislocation of image surface in the feed direction was −9.3695 mm, the maximum dislocation of image surface in the scanning direction was. −3.7739 mm, and the maximum f$\theta$ error was 0.3842 mm.

EXAMPLE 6

| Polygonal Optical Deflector | |
| --- | --- |
| Rm (mm) | 25 |
| b (mm) | 2000 |
| c (mm) | 383.035349 |
| Point of departure (x, y, z) (mm) ($\theta = 0$) | (0, 100, −5) |
| Size of beam at point of departure (mm) | $b_{wx} = 5, b_{wz} = 1$ |
| l (mm) | −6.39375 |
| Correcting Lens | |
| Refractive index | 1.5 |
| Radius (mm) | 21.875292 |
| Thickness (center) (mm) | 10 |
| Coefficient of x to the second power | 0.001015625 |
| Coefficient of x to the fourth power | −0.0000001 |
| Vertex ($x_c, y_c, z_c$) (mm) ($\theta = 0$) | (0, 200, 11.6666667) |
| Objective Surface Center ($x_s, y_s, z_s$) (mm) ($\theta = 0$) | (0, 261.48818, 15.7658787) |
| Effective Scanning distance (mm) | 220 |
| Available Angular Range of Reflecting Surface (deg) | 40 |

Figure 12A:
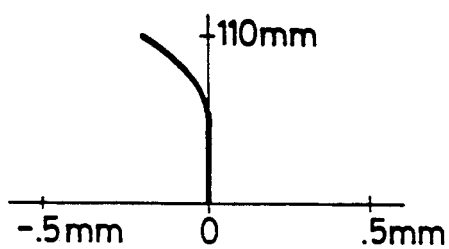
Figure 12B:
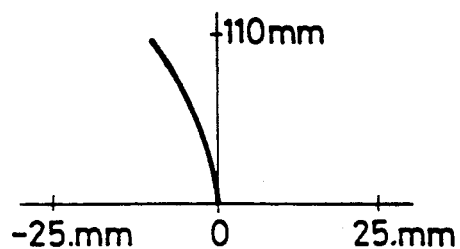
Figure 12C:
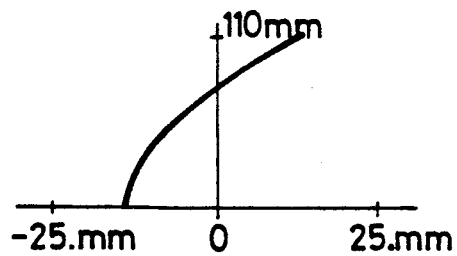
Figure 12D:
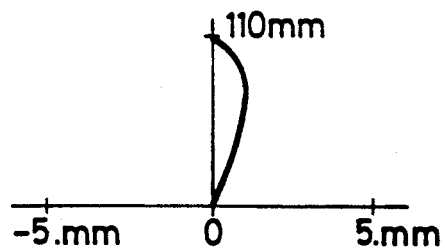

Results of the simulation are shown in FIGS. 12(a) (curvature of scanning line), 12(b) (curvature of image surface in the feed direction), 12(c) (curvature of image surface in the scanning direction), and 12(d) (f$\theta$ error). The maximum curvature of scanning line was −0.20139 mm, the maximum dislocation of image surface in the feed direction was −9.992 mm, the maximum dislocation of image surface in the scanning direction was 13.9393 mm, and the maximum f$\theta$ error was 1.0074 mm.

EXAMPLE 7

| Polygonal Optical Deflector | |
| --- | --- |
| Rm (mm) | 16 |
| b (mm) | 116.150644 |
| c (mm) | 125.522999 |
| Point of departure (x, y, z) (mm) ($\theta = 0$) | (0, 100, −5) |
| Size of beam at point of departure (mm) | $b_{wx} = 5, b_{wz} = 1$ |
| l (mm) | −33.7012657 |
| Correcting Lens | |
| Refractive index | 1.5 |
| Radius (mm) | 14.8893078 |
| Thickness (center) (mm) | 10 |
| Coefficient of x to the second power | $1.80717663 \times 10^{-3}$ (mm$^{-1}$) |
| Coefficient of x to the fourth power | $-0.59585052 \times 10^{-7}$ (mm$^{-3}$) |
| Vertex ($x_c, y_c, z_c$) (mm) ($\theta = 0$) | (0, 167.788854, 10.7653935) |
| Objective Surface Center ($x_s, y_s, z_s$) (mm) ($\theta = 0$) | (0, 208.140537, 11.4369367) |
| Effective Scanning distance (mm) | 220 |
| Available Angular Range of Reflecting Surface (deg) | 40 |

Figure 13A:
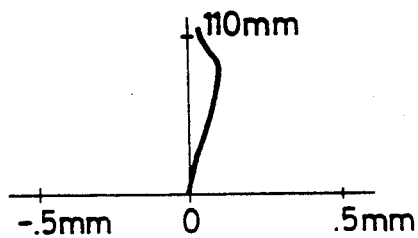
Figure 13B:
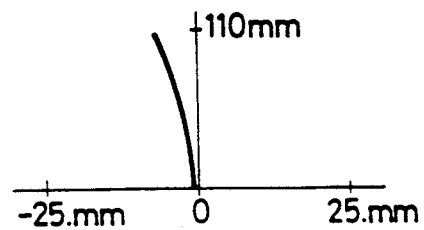
Figure 13C:
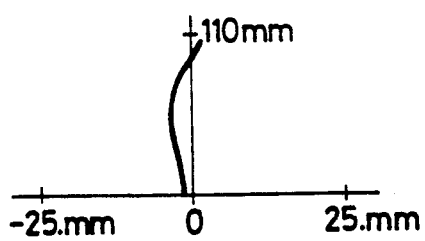
Figure 13D:
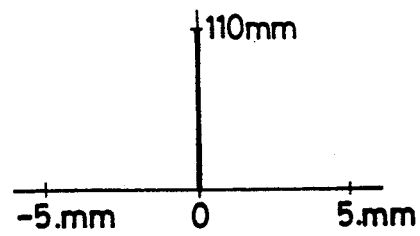

Results of the simulation are shown in FIGS. 13(a) (curvature of scanning line), 13(b) (curvature of image surface in the feed direction), 13(c) (curvature of image surface in the scanning direction), and 13(d) (f$\theta$ error). The maximum curvature of scanning line was 0.1038 mm, the maximum dislocation of image surface in the feed direction was −6.9492 mm, the maximum dislocation of image surface in the scanning direction was 3.2086 mm, and the maximum f$\theta$ error was −0.0655 mm.

Reference Postobjective Optical Scanner

Parameters and measured results of a reference postobjective optical scanner provided with a polygonal optical deflector having reflecting surfaces each formed of a portion of an elliptic cylinder, and an ordinary cylindrical correcting lens will be provided hereunder.

| Polygonal Optical Deflector | |
| --- | --- |
| Rm (mm) | 25 |
| b (mm) | 2000 |
| c (mm) | 383.035349 |
| Point of departure (x, y, z) (mm) ($\theta = 0$) | (0, 100, −5) |
| Size of beam at point of departure (mm) | $b_{wx} = 5, b_{wz} = 1$ |
| l (mm) | −6.55 |

Figure 14A:
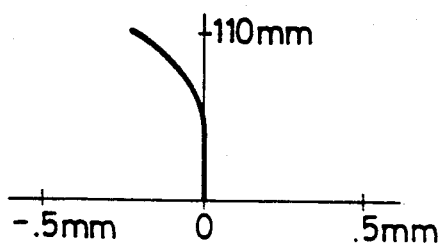
FIGS. 14(a) to 14(d) are graphs showing the respective measured data of the curvature of scanning line, the dislocation of image surface in the feed direction, the dislocation of image surface in the scanning direction, and f$\theta$ error in a postobjective optical scanner employing a conventional cylindrical lens.
Figure 14B:
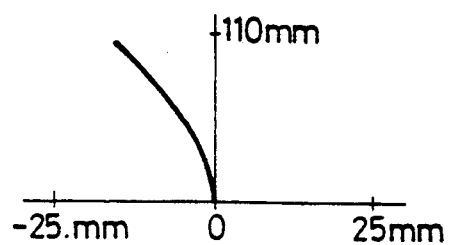
Figure 14C:
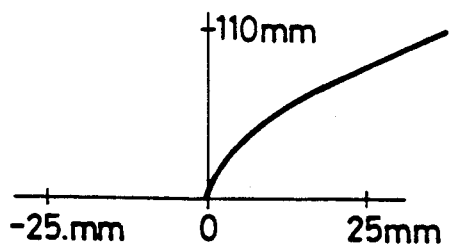
Figure 14D:
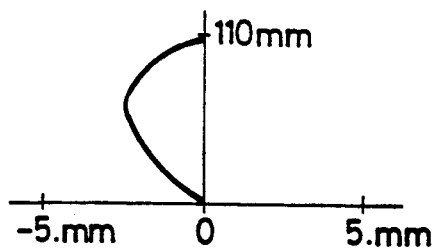

Results of the simulation are shown in FIGS. 14(a), curvature of scanning line), 14(b) (curvature of image surface in the feed direction), 14(c) (curvature of image surface in the scanning direction), and (d) (f$\theta$ error). The respective maximum values of curvature of scanning line, dislocation of image surface in the feed direction, dislocation of image surface in the scanning direction, and f$\theta$ error of the reference postobjective optical scanner are considerably greater than the respective corresponding maximum values of the foregoing examples, and the measured results proved that the correcting effect of the correcting lens 3 of the present invention is significant.

As is apparent from the foregoing description of the postobjective optical deflector in the first embodiment according to the present invention, since each reflecting surfaces of the polygonal optical deflector has two axial components and hence have a degree of freedom greater by one than that of spherical or cylindrical reflecting surfaces, the degree of freedom of design is increased. Since one of the surfaces of the correcting lens employed in the postobjective optical scanner of the present invention corresponding to the flat surface of the ordinary cylindrical correcting lens is formed in a curved surface of even degree, the tilt of the reflecting surfaces of the polygonal optical deflector can be corrected, and thereby the combination of the polygonal optical deflector and the pseudocylindrical correcting lens corrects the curvature of image surface and $f\theta$ characteristics at a high accuracy.

Second Embodiment (FIGS. 15 to 19(d))

In FIGS. 15 to 19(d), parts like or corresponding to those previously described with reference to FIGS. 1 to 14(d) are denoted by the same reference numerals or characters.

A postobjective optical scanner in a second embodiment according to the present invention comprises a polygonal optical deflector 1, and a pseudocylindrical correcting lens 3 disposed near an objective surface 2.

Figure 16:
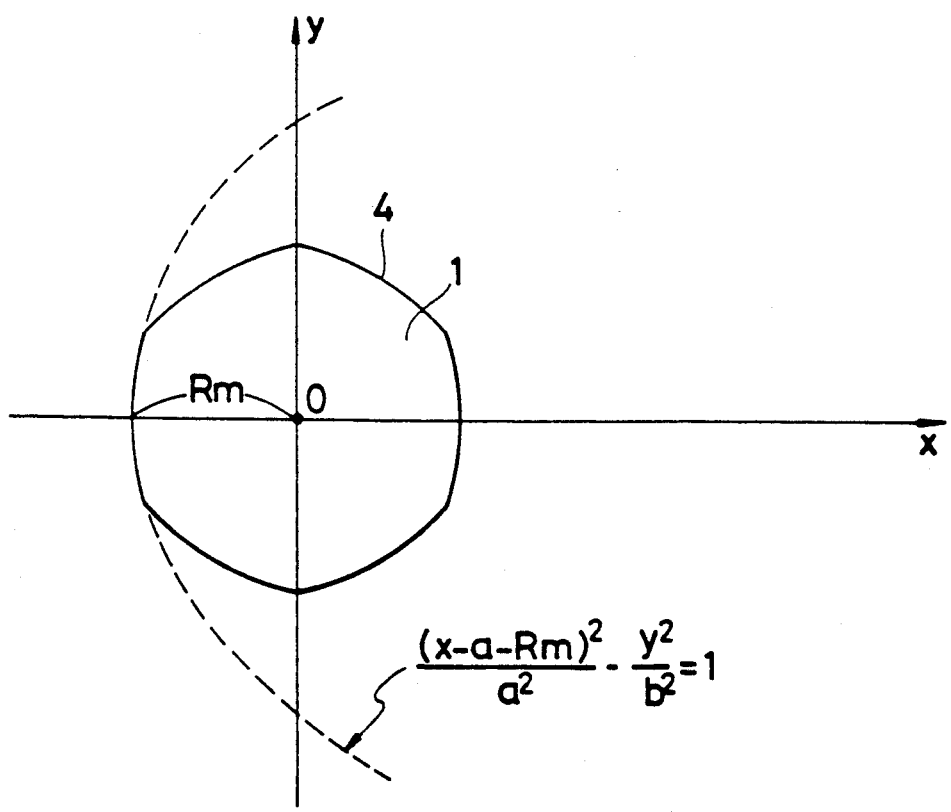
FIG. 16 is a plan view of the polygonal optical deflector of FIG. 15.

As shown in FIG. 16, the polygonal optical deflector 1 rotates about an axis passing a point (center) O and perpendicular to the sheet. The polygonal optical deflector 1 has six reflecting surfaces 4 each formed of a portion of a hyperboloid or a hyperbolic cylinder having a contour defined by an equation:

$$(x-a-Rm)^2/a^2 - y^2/b^2 = 1$$

with its origin at the point O, where a and b are constants.

The pseudocylindrical correcting lens 3 has a cylindrical surface 5 similar to that of the ordinary cylindrical lens, and a curved surface 6 of higher degree having a contour defined by $a_2 x^2 + a_4 x^4$ ($a_2$ and $a_4$ are coefficients)

An axial beam 7 and a differential beam 8 fall on the reflecting surface 4 of the polygonal optical deflector 1 so as to converge on a point $S_0$ at a distance from the center O of the polygonal optical deflector 1. The axial beam 7 and the differential beam 8 reflected by the reflecting surface 4 are focused by the pseudocylindrical correcting lens 3 on a point S.

Figure 15:
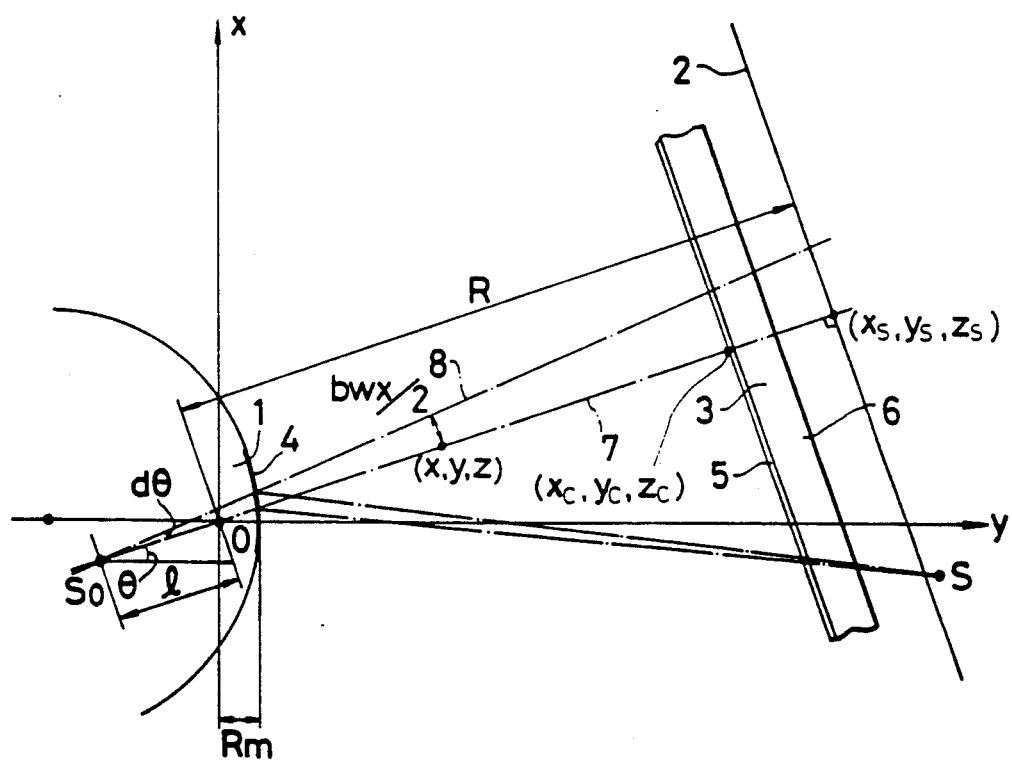
FIG. 15 is a diagrammatic illustration showing the disposition of a polygonal optical deflector and a correcting lens employed in a postobjective optical scanner in a second embodiment according to the present invention with respect to an objective surface.

Referring to FIG. 15, Rm is the radius of the inscribed circle of the circumferential contour of the polygonal optical deflector 1, R is the distance between the axis of rotation of the polygonal optical deflector 1 and the objective surface 2, $L_0$, not shown, is the effective scanning distance, $\theta$ is the phase of the polygonal optical deflector 1, and y is the position of a scanning spot on the objective surface 2.

Although the incident light beam has no direction cosine, the phase $\theta = 0$ and $y = 0$ when the direction cosine of the light beam reflected by the reflecting surface 4 of the polygonal optical deflector 1 is zero, and $y = L_0/2$ when $\theta = \theta_0$. The rotation of the polygonal optical deflector 1 through an angle of 60° corresponds to one scanning cycle. Simulated operation of examples of the second embodiment was performed to determine optimum values for the parameters including the distance R, the coefficient $a_2$ of x to the second power, the coefficient $a_4$ of x to the fourth power, the thickness of the pseudocylindrical correcting lens 3 and the disposition of the pseudocylindrical correcting lens 3 so that the curvature of image surface in the feed direction, the curvature of image surface in the scanning direction, the curvature of scanning line and the $f\theta$ characteristics are corrected appropriately.

EXAMPLE 1

| Polygonal Optical Deflector | |
|---|---|
| Rm (mm) | 16.0 |
| a (mm) | 17.0768 |
| b (mm) | 38.5513 |
| Point of departure (x, y, z) (mm) ($\theta = 0$) | (0, 100, −5) |
| Size of beam at point of departure (mm) | $b_{wx} = 5$, $b_{wz} = 1$ |
| l (mm) | 21.0430 |
| Pseudocylindrical Correcting Lens | |
| Refractive index | 1.5 |
| Radius (mm) | 15.7950 |
| Thickness (center) (mm) | 10 |
| $a_2$ (mm$^{-1}$) | $1.0620 \times 10^{-3}$ |
| $a_4$ (mm$^{-3}$) | $-9.4204 \times 10^{-8}$ |
| Vertex ($x_c, y_c, z_c$) (mm) ($\theta = 0$) | (0, 228.9766, 12.9106) |
| Objective Surface Center ($x_s, y_s, z_s$) (mm) ($\theta = 0$) | (0, 269.3315, 15.0792) |
| Effective Scanning Distance (mm) | 220 |
| Available Angular Range of Reflecting Surface (deg) | 40 |

Figure 17:
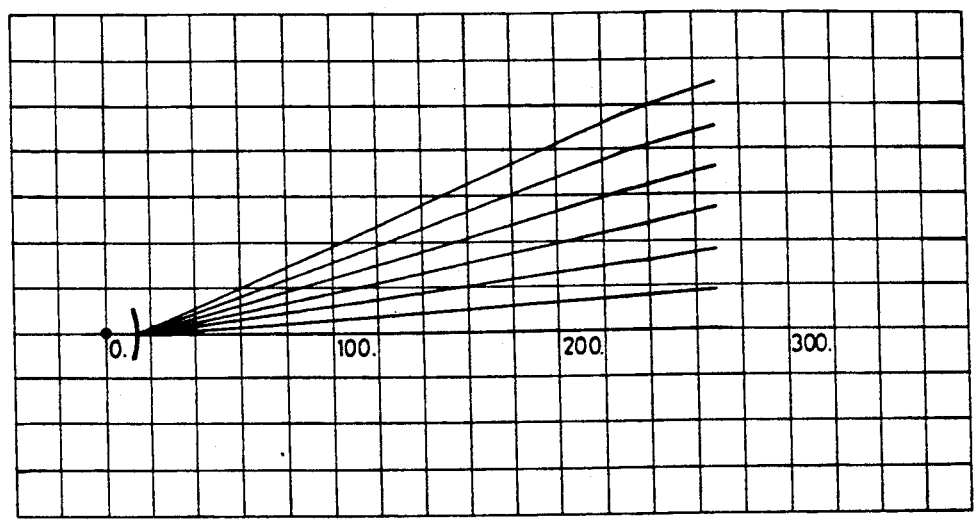
FIG. 17 is a diagram showing light beams as viewed along the z-axis of an Example 1 of the postobjective optical scanner of FIG. 15.
Figure 18:
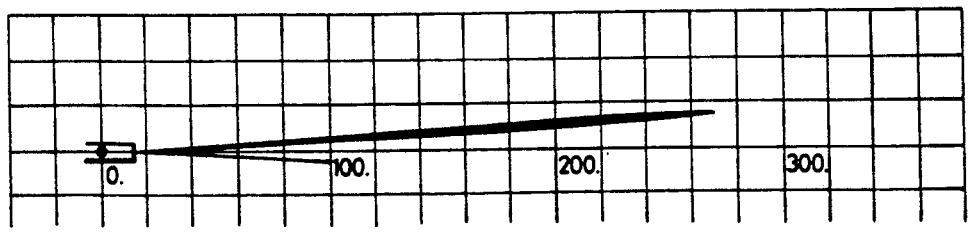
FIG. 18 is a diagram showing light beams as viewed along the x-axis of the Example 1 of the postobjective optical deflector of FIG. 15.

FIGS. 17 and 18 show light beams in this example, as viewed in the z-axis and the x-axis, respectively.

Figure 19A:
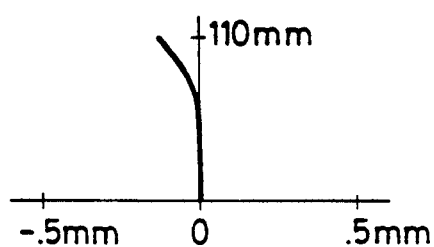
FIGS. 19(a) to 19(d) are graphs showing the respective measured data of the curvature of scanning line, dislocation of image surface in the feed direction, dislocation of image surface in the scanning direction, and fθ error in an Example 1 of the second embodiment.
Figure 19B:
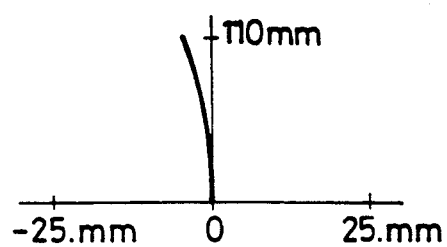
Figure 19C:
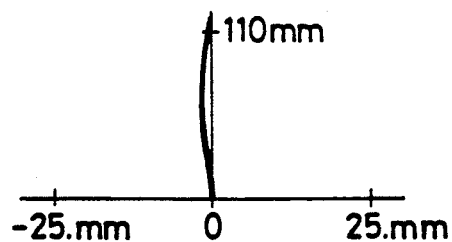
Figure 19D:
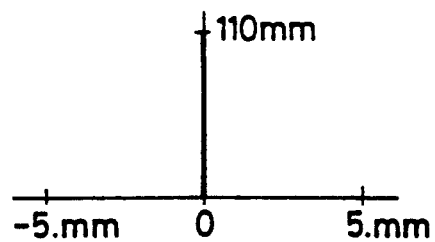

Results of the simulation are shown in FIGS. 19(a) (curvature of scanning line), 19(b) (curvature of image surface in the feed direction), 19(c) (curvature of image surface in the scanning direction), and 19(d) ($f\theta$ error). The maximum curvature of scanning line was −0.1250 mm, the maximum curvature of image surface in the feed direction was −4.6043 mm, the maximum curvature of image surface was −1.4320 mm, and the maximum $f\theta$ error was $-2.4469 \times 10^{-2}$ mm.

EXAMPLE 2

| Polygonal Optical Deflector | |
|---|---|
| Rm 2(mm) | 24 |
| a (mm) | 46.9598 |
| b (mm) | 60.2560 |
| Point of departure (x, y, z) (mm) ($\theta = 0$) | 0, 100, (−5) |
| Size of beam at point of departure (mm) | $b_{wx} = 5$, $b_{wz} = 1$ |
| l (mm) | −9.4665 |
| Pseudocylindrical Correcting Lens | |
| Refractive index | 1.5 |
| Radius (mm) | 15.6868 |
| Thickness (center) (mm) | 10 |
| $a_2$ (mm$^{-1}$) | $4.7712 \times 10^{-4}$ |
| $a_4$ (mm$^{-3}$) | $-8.8537 \times 10^{-8}$ |
| Vertex ($x_c, y_c, z_c$) (mm) ($\theta = 0$) | (0, 236.8571, 15.0194) |
| Objective Surface Center ($x_s, y_s, z_s$) (mm) ($\theta = 0$) | (0, 276.9392, 16.6407) |
| Effective Scanning Distance (mm) | 220 |
| Available Angular Range of Reflecting Surface (deg) | 40 |

The paths of the light beams are similar to those shown in FIGS. 17 and 18.

Figure 20A:
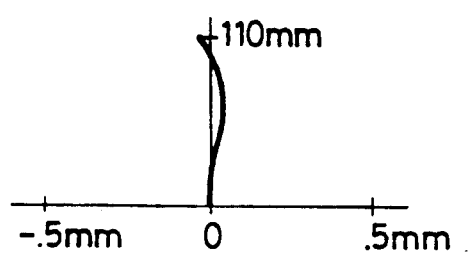
FIGS. 20(a) to 20(d) are graphs showing the respective measured data of the curvature of scanning line, the dislocation of image surface in the feed direction, the dislocation of image surface in the scanning direction, and fθ error in an Example 2 of the second embodiment.
Figure 20B:
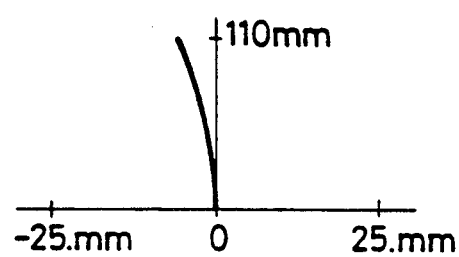
Figure 20C:
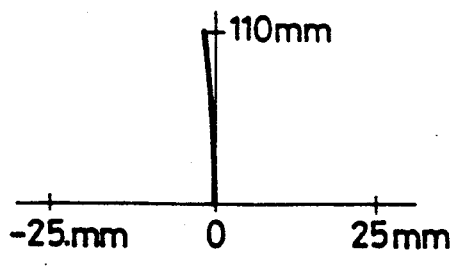
Figure 20D:
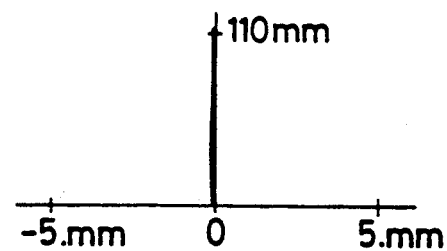

Results of the simulation are shown in FIGS. 20(a) (curvature of scanning line), 20(b) (curvature of image surface in the feed direction, 29(c) (curvature of image surface in the scanning direction), and 20(d) ($f\theta$ error). The maximum curvature of scanning line was $3.7581 \times 10^{-2}$ mm, the maximum curvature of image surface in the feed direction was −5.9444 mm, the maximum curvature of image surface in the scanning direction was −2.1230 mm, and the maximum $f\theta$ error was $-2.3171 \times 10^{-2}$ mm.

Thus, the postobjective optical scanner in the second embodiment comprises the polygonal optical deflector having the reflecting surfaces each formed of a portion of a convex hyperboloid or a convex hyperbolic cylinder, and the pseudocylindrical correcting lens disposed between the polygonal optical deflector and the objective surface, and having a cylindrical surface having its power on the feed side, and a curved surface of an even degree having its power on the scanning side. Since each reflecting surface of the polygonal optical deflector has two axial components, the degree of freedom of the reflecting surface is greater by one than that of a reflecting surface formed of a portion of spherical surface or a cylindrical surface, which increases the degree of freedom of design. Furthermore, since the surface of the correcting lens employed in the second embodiment corresponding to the flat surface of the ordinary correcting lens is formed of a curved surface of even degree, the tilt of the reflecting surfaces of the polygonal optical deflector and the curvature of image surface can be corrected and the $f\theta$ characteristics can be improved. Thus, the combination of the polygonal optical deflector and the pseudocylindrical correcting lens corrects the curvature of image surface and $f\theta$ characteristics at a high accuracy.

Third Embodiment (FIGS. 21 to 26(d))

In FIGS. 21 to 26(d), parts like or corresponding to those described previously with reference to FIGS. 1 to 14(d) are denoted by the same reference numerals or characters.

A postobjective optical scanner in a third embodiment according to the present invention comprises a polygonal optical deflector 1, and a pseudocylindrical correcting lens 3 disposed near an objective surface 2.

Figure 22:
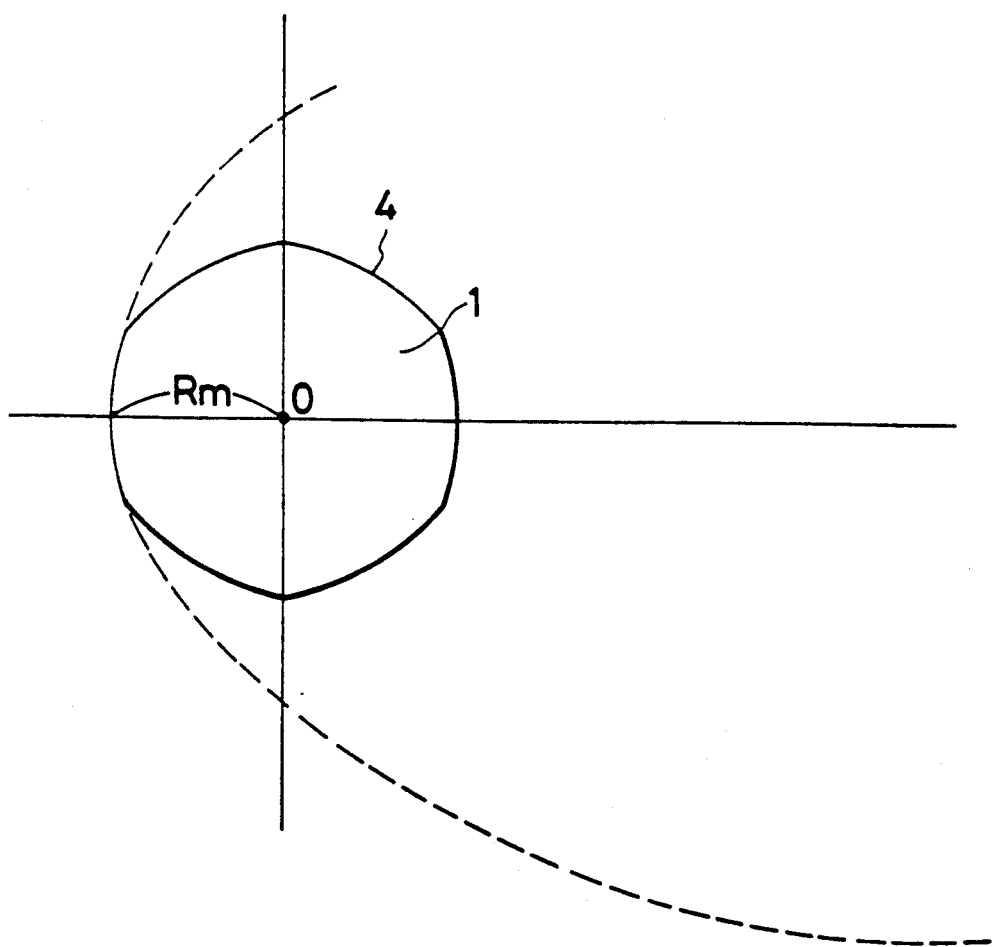
FIG. 22 is a plan view of the polygonal optical deflector of FIG. 21.

As shown in FIG. 22, the polygonal optical deflector 1 rotates about an axis passing a point (center) O and perpendicular to a plane swept by a scanning beam, and has six reflecting surface 4 each formed of a portion of a paraboloid or a parabolic cylinder.

The pseudocylindrical correcting lens 3 has a cylindrical surface 5 similar to that of the ordinary cylindrical lens, and a curved surface 6 of higher degree having a contour represented by: $a_2x^2 + a_4x^4$ ($a_2$ and $a_4$ are constants). That is, the curved surface 6 is a curved surface of even degree.

An axial light beam 7 and a differential light beam 8 fall on the reflecting surface 4 of the polygonal optical deflector 1 so as to converge on a point $S_0$ at a distance from the center O of the polygonal optical deflector 1. The axial light beam and the differential light beam 8 reflected by the reflecting surface 4 of the polygonal optical deflector 1 travel through the correcting lens 3 and are focused on a point S.

Figure 21:
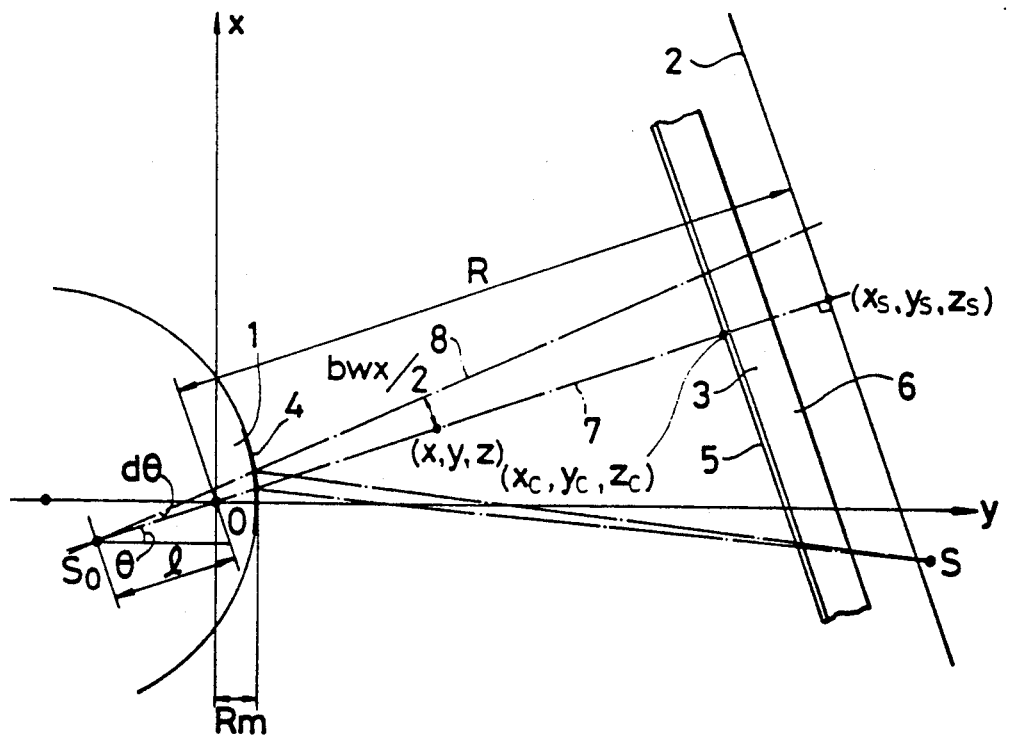
FIG. 21 is a diagrammatic illustration showing the disposition of a polygonal optical deflector and a correcting lens employed in a postobjective optical scanner in a third embodiment according to the present invention with respect to an objective surface.

Parameters shown in FIG. 21 will be described hereinafter. In FIG. 21, a is the coefficient of x of the second degree, Rm is the radius of the inscribed circle of the circumferential contour of the polygonal optical deflector 1, R is the distance between the axis of rotation of the polygonal optical deflector 1 and the objective surface 2, an effective scanning distance $L_0$, not shown, P is the phase of the polygonal optical deflector 1, and y is the position of a scanning spot on the objective surface 2. Although the direction cosine of the incident light beam has no x-component, the phase $\theta = 0$ and $y = 0$ when the x-component of the direction cosine of the reflected light beam reflected by the polygonal optical deflector 1 is zero, and $y = L_0/2$ when $\theta = \theta_0$. The polygonal optical deflector 1 turns through an angle of 60° for one scanning cycle. Parametric simulation was performed to determine the parameters, namely, the coefficient a of second degree of the parabolic surface or parabolic cylinder forming the reflecting surfaces of the polygonal optical deflector 1, the distance R, the coefficients of x to the second power and fourth power of the equation defining the curved surface 6 of higher degree of the pseudocylindrical correcting lens 3, the thickness of the pseudocylindrical correcting lens 3, and the disposition of the pseudocylindrical correcting lens, to reduce the error in the linearity of the scanning line to zero. Results of parametric simulation were evaluated in terms of curvature of image surface in the feed direction, curvature of image surface in the scanning direction, $f\theta$ characteristics and curvature of scanning line.

EXAMPLE 1

| Polygonal Optical Deflector | |
| --- | --- |
| Rm (mm) | 16.0 |
| a (mm$^{-1}$) | $3.6105 \times 10^{-3}$ |
| Point of departure (x, y, z) (mm) ($\theta = 0$) | (0, 100, −5) |
| Size of beam at point of departure | $b_{wx} = 1, b_{wz} = 1$ |
| l (mm) | −34.4346 |
| Pseudocylindrical Correcting Lens | |
| Refractive index | 1.5 |
| Radius (mm) | 14.7687 |
| Thickness (center) (mm) | 10 |
| $a_2$ (mm$^{-1}$) | $1.8887 \times 10^{-3}$ |
| $a_4$ (mm$^{-3}$) | $-1.5361 \times 10^{-7}$ |
| Vertex ($x_c, y_c, z_c$) (mm) ($\theta = 0$) | (0, 166.5810, 10.2394) |
| Objective Surface | (0, 206.6237, 11.3466) |
| Center ($x_s, y_s, z_s$) (mm) ($\theta = 0$) | |
| Effective Scanning Distance (mm) | 220 |
| Available Angular range of reflecting surface (deg) | 40 |

Figure 23:
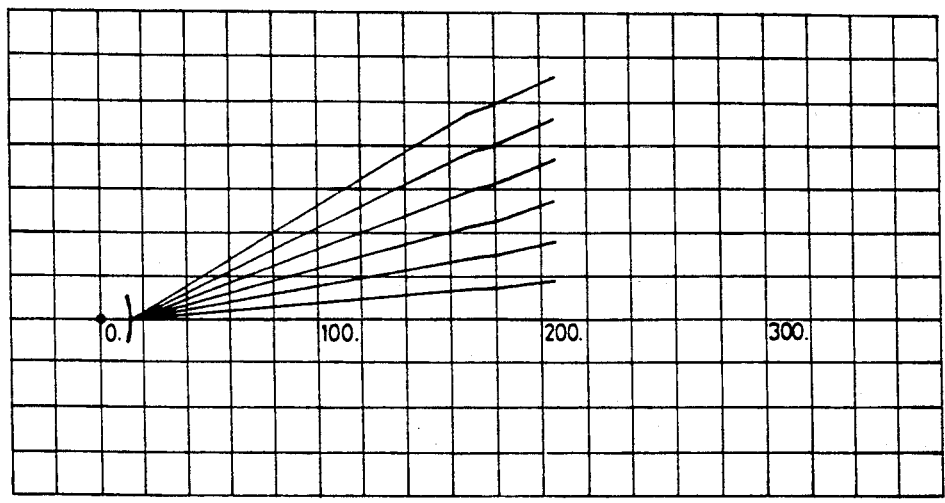
FIG. 23 is a diagram showing light beams as viewed along the z-axis of an Example 1 of the postobjective optical scanner of FIG. 21.

Results of the simulation are shown in FIGS. 23 (light beams as viewed along the x-axis), 24 (light beams as viewed along the z-axis), 25(a) (curvature of scanning line), 25(b) (curvature of image surface in the feed direction), 25(c) (curvature of image surface in the scanning direction), and 25(d) ($f\theta$ error). The maximum curvature of scanning line was $-6.2888 \times 10^{-2}$ mm, the maximum curvature of image surface in the feed direction were −6.6502 mm, the maximum curvature of image surface in the scanning direction was −2.26410, and the maximum $f\theta$ error was −0.1884 mm.

EXAMPLE 2

| Polygonal Optical Deflector | |
| --- | --- |
| Rm (mm) | 16 |
| a (mm$^{-1}$) | $3.2623 \times 10^{-3}$ |
| Point of departure (x, y, z) (mm) ($\theta = 0$) | (0, 100, −5) |
| Size of beam at point of departure | $b_{wx} = 1, b_{wz} = 1$ |
| l (mm) | −41.1647 |
| Pseudocylindrical Correcting Lens | |
| Refractive index | 1.5 |
| Radius (mm) | 15.3892 |
| Thickness (center) | 10 |
| $a_2$ (mm$^{-1}$) | $1.3529 \times 10^{-3}$ |
| $a_4$ (mm$^{-3}$) | $-1.1620 \times 10^{-7}$ |
| Vertex ($x_c, y_c, z_c$) (mm) ($\theta = 0$) | (0, 236.8571, 15.0194) |
| Objective Surface | (0, 205.4683, 12.3763) |
| Center ($x_s, y_s, z_s$) (mm) ($\theta = 0$) | |
| Effective Scanning Distance (mm) | 220 |
| Available Angular Range of Reflecting Surface (deg) | 40 |

Figure 24:
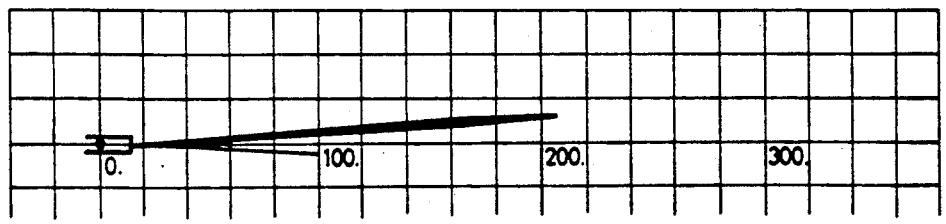
FIG. 24 is a diagram showing light beams as viewed along the x-axis of the Example 1 of the postobjective optical scanner of FIG. 21.
Figure 25A:
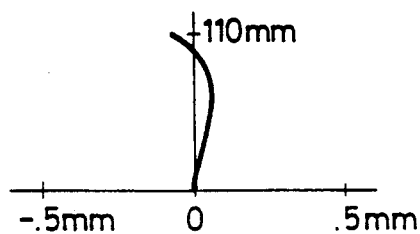
FIGS. 25(a) to 25(d) are graphs showing the respective measure data of the curvature of scanning line, the dislocation of image surface in the feed direction, the dislocation of image surface in the scanning direction, and fθ error in the Example 1 of the third embodiment.
Figure 25B:
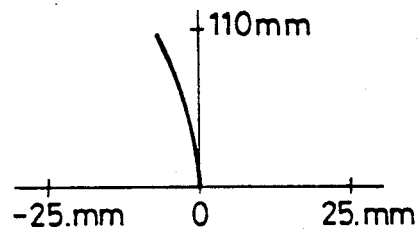
Figure 25C:
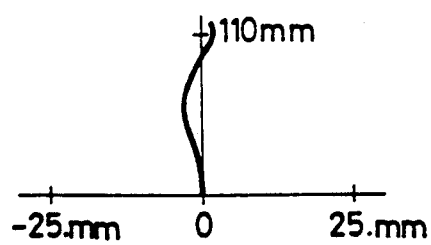
Figure 25D:
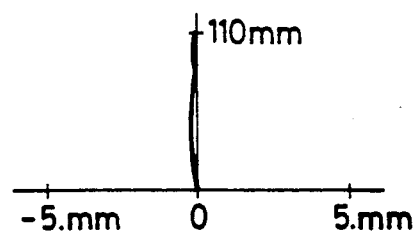

Paths of light beams as viewed along the z-axis and the x-axis are similar to those shown in FIGS. 23 and 24.

Figure 26A:
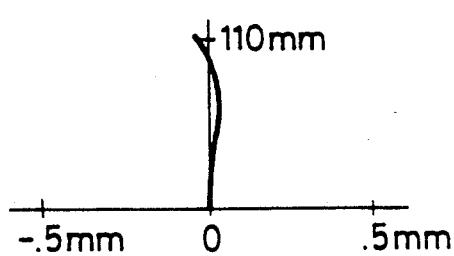
FIGS. 26(a) to 26(d) are graphs showing the respective measured data of the curvature of scanning line, the dislocation of image surface in the feed direction, the dislocation of image surface in the scanning direction, and fθ error in an Example 2 of the third embodiment.
Figure 26B:
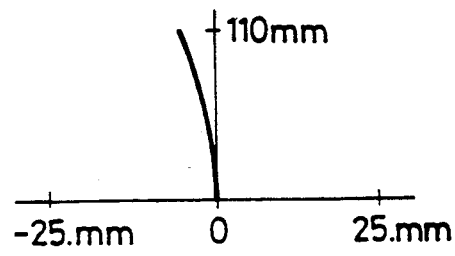
Figure 26C:
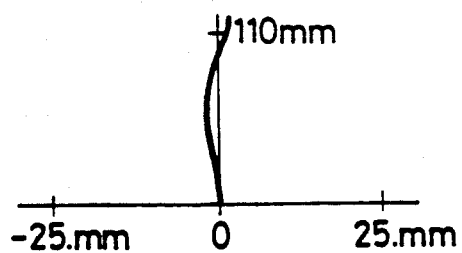
Figure 26D:
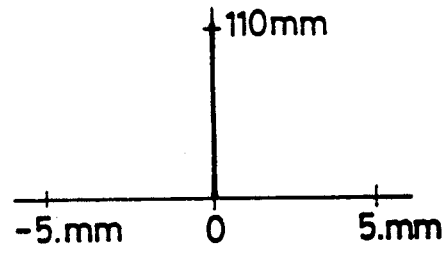

Results of the simulation are shown in FIGS. 26(a) (curvature of scanning line), 26(b) (curvature of image surface in the feed direction), 26(c) (curvature of image surface in the scanning direction), and 26(d) (fθ error). The maximum curvature of scanning line was $3.5940 \times 10^{-2}$ mm, the maximum curvature of image surface in the feed direction was $-5.0589$ mm, the maximum curvature of image surface in the scanning direction was 1.8314 mm, and the maximum fθ error was $-2.3171 \times 10^{-2}$ mm.

Since the postobjective optical deflector in the third embodiment according to the present invention thus comprises the polygonal optical deflector having reflecting surfaces for reflecting a light beam emitted from a light source each formed of a portion of a convex parabolic surface of a parabolic cylinder, and the pseudocylindrical correcting lens disposed between the polygonal optical deflector and the objective surface, and having a cylindrical surface having power on the feed side, and a curved surface of even degree having power on the scanning side, the fθ characteristics and curvature of image surface can be corrected by the variation in the curvature of the reflecting surfaces of the polygonal optical deflector each formed of a portion of a parabolic surface of a parabolic cylinder and by the power in the scanning direction of the cylindrical surface of the pseudocylindrical correcting lens. Thus, the combination of the polygonal optical deflector and the pseudocylindrical correcting lens correct the curvature of image surface and fθ characteristics at a high accuracy.

Fourth Embodiment (FIGS. 27 to 32(d))

A postobjective optical scanner in a fourth embodiment according to the present invention comprises a polygonal optical deflector 1 and a pseudocylindrical correcting lens 3 disposed near an objective surface 2.

The polygonal optical deflector 1 rotates about an axis passing a point (center) O perpendicularly to a plane swept by a scanning beam, and has six reflecting surfaces 4 each formed of a curved surface of a higher degree not less than fourth degree defined by a polynominal of even degree.

The pseudocylindrical correcting lens 3 has a cylindrical surface similar to that of the ordinary cylindrical lens and a curved surface 6 of higher degree defined by $a_2 x^2 + a_4 x^4$ ($a_2$ and $a_4$ are constants). That is, the curved surface 6 is a curved surface of even degree.

An axial light beam 7 and a differential light beam 8 fall on the reflecting surface 4 of the polygonal optical deflector 1 so as to converge on a point $S_0$ at a distance from the center O of the polygonal optical deflector 1. The axial light beam 7 and the differential light beam 8 reflected by the reflecting surface 4 of the polygonal optical deflector 1 travel through the pseudocylindrical correcting lens 3 and are focused on a point S.

Figure 27:
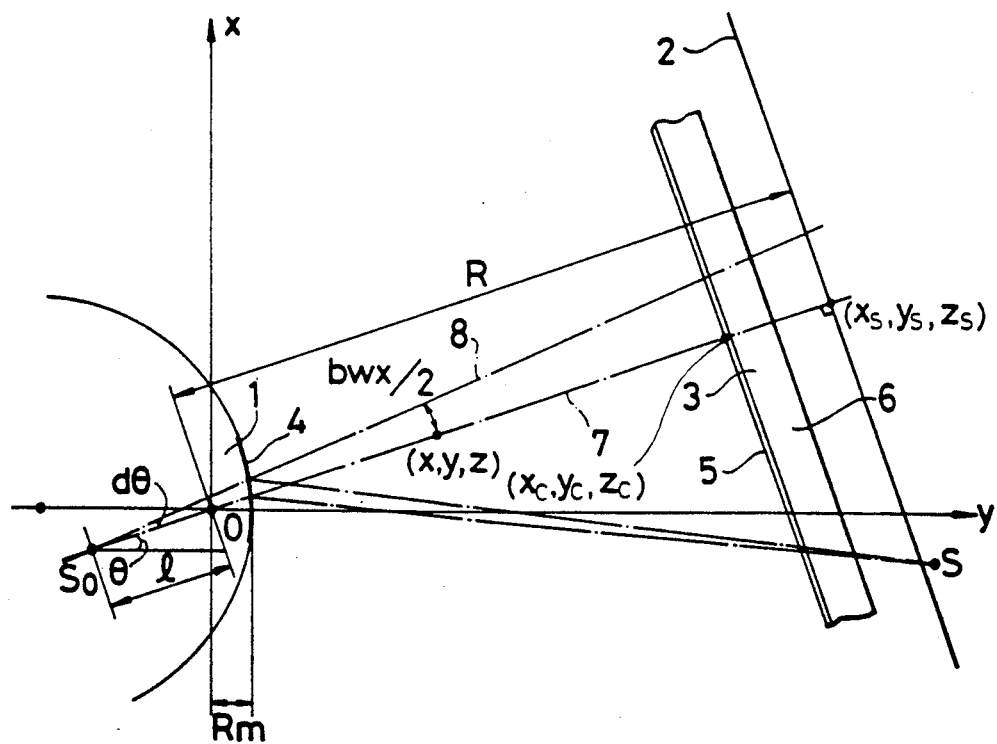
FIG. 27 is a diagrammatic illustration of the disposition of a polygonal optical deflector and a correcting lens employed in a postobjective optical deflector in a fourth embodiment according to the present invention with respect to an objective surface.
Figure 28:
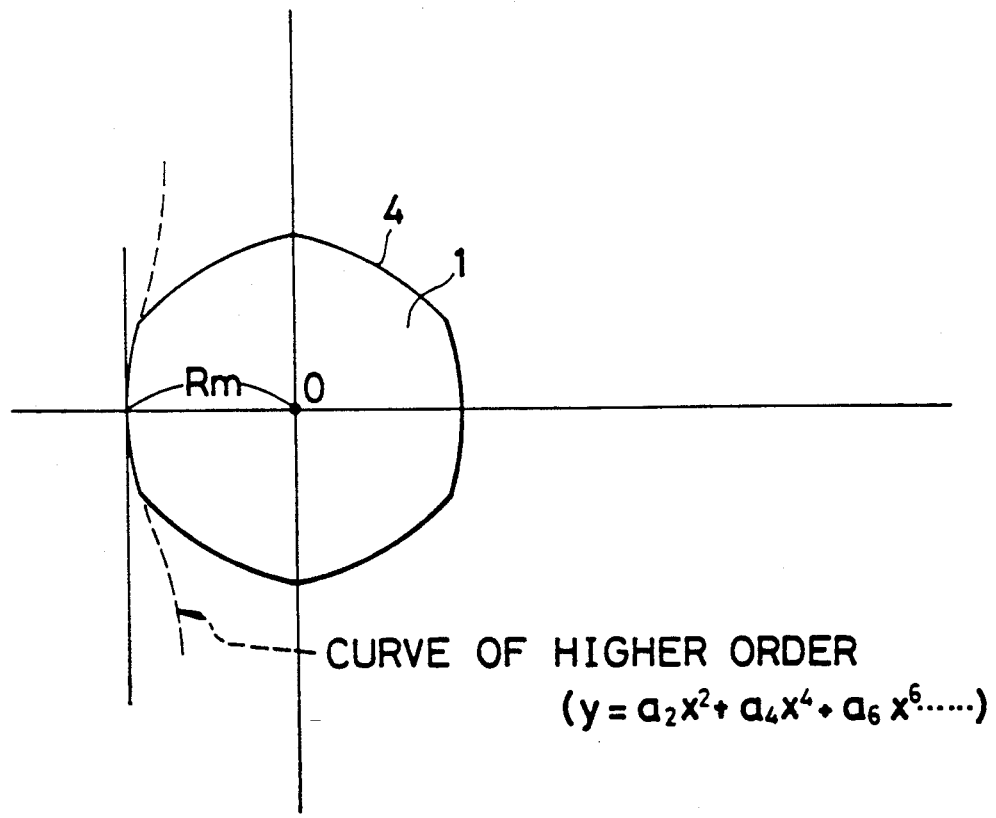
FIG. 28 is a plan view of the polygonal optical deflector of FIG. 27.

Parameters shown in FIG. 27 will be described hereinafter. Coefficients $a_2$, $a_4$ and $a_6$ are the coefficient respectively of a term of the second degree, a term of the fourth degree and a term of the sixth degree of the polynominal of even degree defining the shape of the polygonal optical reflecting surfaces 4, Rm is the radius of an inscribed circle of the circumferential contour of the polygonal optical deflector 1, R is the distance between the axis of rotation of the polygonal optical deflector 1 and the objective surface 2, $L_0$ is an effective scanning distance, not shown, and θ is the phase of the polygonal optical deflector 1. Although the direction cosine of the incident light beam has no x-component, the phase $\theta = 0$ and the position $y = 0$ when the x-component of the direction cosine of the reflected light beam reflected by the polygonal optical deflector 1 is zero, and the phase $\theta = \theta_0$ when $y = L_0/2$. The polygonal optical deflector 1 turns through an angle of 60° for one scanning cycle. Parametric simulation was performed to determine the coefficients $a_2$, $a_4$ and $a_6$, the distance R, the coefficients of x to the second power and the fourth power of an expression representing the curved surface 6 of higher degree of the pseudocylindrical correcting lens 3, the thickness and disposition of the pseudocylindrical correcting lens 3 so that the effective scanning distance is 220 mm when the available angular range of reflecting surface is an angle of 40° and error in the linearity of the scanning line is reduced to zero. Results of the simulation were evaluated in terms of curvature of scanning line, curvature of image surface in the feed direction, curvature of image surface in the scanning direction, and fθ characteristics.

EXAMPLE 1

| Polygonal Optical Deflector | |
| --- | --- |
| Rm (mm) | 16 |
| $a_2$ (mm$^{-1}$) | $3.6564 \times 10^{-4}$ |
| $a_4$ (mm$^{-3}$) | $-1.2116 \times 10^{-9}$ |
| $a_6$ (mm$^{-5}$) | $-3.4997 \times 10^{-10}$ |
| Point of departure (x, y, z) (mm) (θ = 0) | (0, 100, −5) |
| l (mm) | −34.0266 |
| Pseudocylindrical Correcting Lens | |
| Refractive index | 1.5 |
| Radius (mm) | 14.7716 |
| Thickness (center) (mm) | 10 |
| Coefficient of term of second degree (mm$^{-1}$) | $1.9627 \times 10^{-3}$ |
| Coefficient of term of fourth degree (mm$^{-3}$) | $-1.6101 \times 10^{-7}$ |
| Vertex ($x_c$, $y_c$, $z_c$) (mm) (θ = 0) | (0, 167.4357, 11.3951) |
| Objective Surface | (0, 207.4373, 11.3951) |
| Center ($x_s$, $y_s$, $z_s$) (mm) (θ = 0) | |
| Effective Scanning distance (mm) | 220 |
| Available Angular Range of Reflecting Surface (deg) | 40 |

Figure 29:
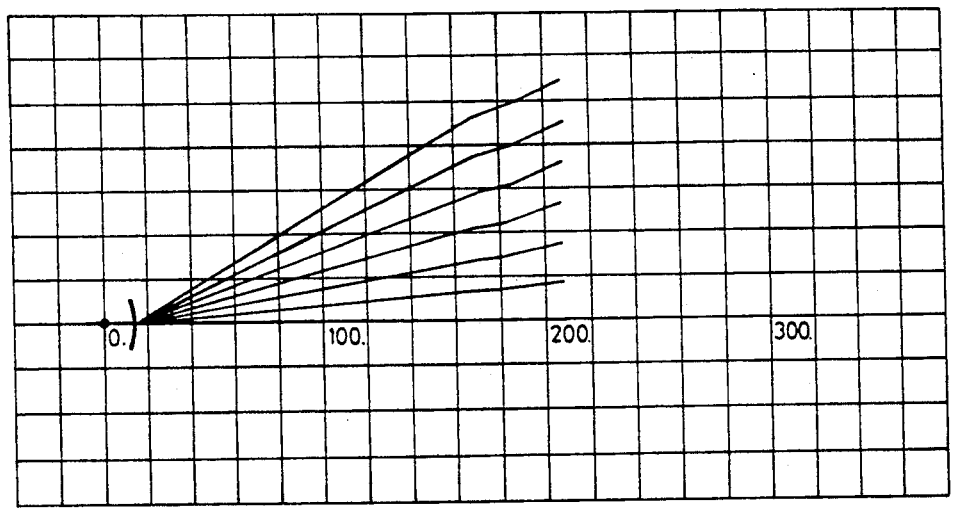
FIG. 29 is a diagram showing light beams as viewed along the z-axis of an Example 1 of the fourth embodiment.
Figure 30:
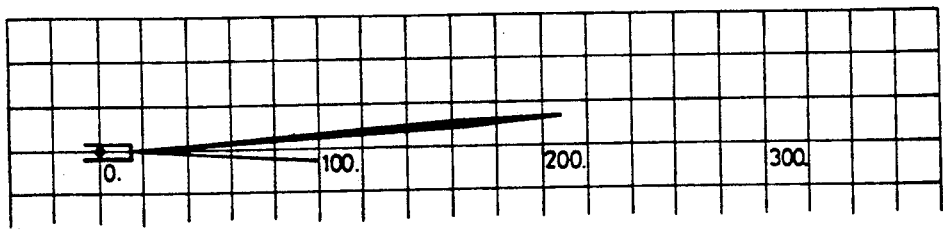
FIG. 30 is a diagram showing light beams as viewed along the x-axis of the Example 1 of the fourth embodiment.

FIGS. 29 and 30 show light beams as viewed along the z-axis and the x-axis, respectively.

Figure 31A:
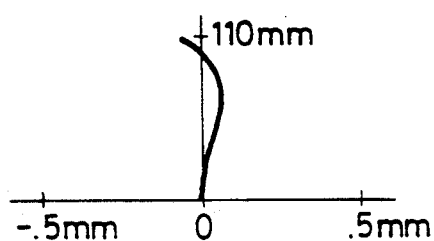
FIGS. 31(a) to 31(d) are graphs showing the respective measured data of the curvature of scanning line, the dislocation of image surface in the feed direction, the dislocation of image surface in the scanning direction, and fθ error in the Example 1 of the fourth embodiment.
Figure 31B:
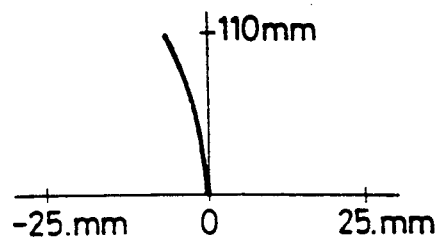
Figure 31C:
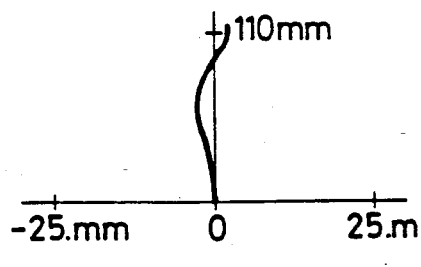
Figure 31D:
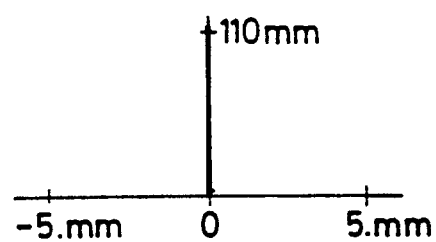
Figure 32A:
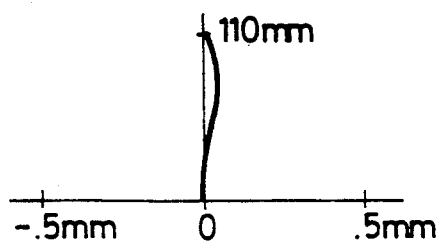
FIGS. 32(a) to 32(d) are graphs showing the respective measured data of the curvature of scanning line, the dislocation of image surface in the feed direction, the dislocation of image surface in the scanning direction, and fθ error in an Example 2 of the fourth embodiment.
Figure 32B:
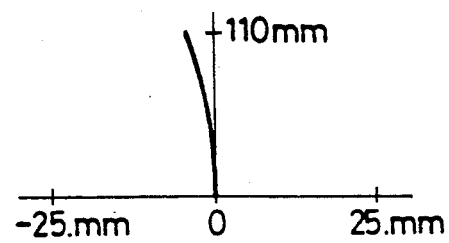
Figure 32C:
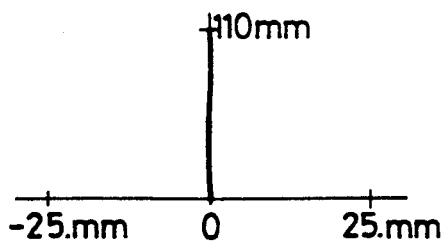
Figure 32D:
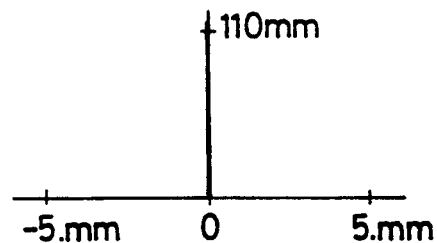

Results of the simulation are shown in FIGS. 31(a) (curvature of scanning line), 31(b) (curvature of image surface in the feed direction), 31(c) (curvature of image surface in the scanning direction), and 31(d) (fθ error) The maximum curvature of scanning line was $6.2161 \times 10^{-2}$ mm, the maximum curvature of image surface in the feed direction was $-6.5394$ mm, the maximum curvature of image surface in the scanning direction was $-2.6151$ mm and the maximum fθ was $-5.7676 \times 10^{-2}$ mm.

EXAMPLE 2

| Polygonal Optical Deflector | |
| --- | --- |
| Rm (mm) | 24 |
| $a_2$ (mm$^{-1}$) | $3.6232 \times 10^{-3}$ |
| $a_4$ (mm$^{-3}$) | $-5.3940 \times 10^{-8}$ |
| $a_6$ (mm$^{-5}$) | $-9.9994 \times 10^{-10}$ |
| Point of departure (x, y, z) (mm) (θ = 0) | (0, 100, −5) |
| l (mm) | −29.8873 |
| Pseudocylindrical Correcting Lens | |
| Refractive index | 1.5 |
| Radius (mm) | 15.6240 |

-continued

| | |
|---|---|
| Thickness (center) (mm) | 10 |
| Coefficient of term of second degree (mm$^{-1}$) | $1.0945 \times 10^{-3}$ |
| Coefficient of term of fourth degree (mm$^{-3}$) | $-9.5307 \times 10^{-8}$ |
| Vertex ($x_c$, $y_c$, $z_c$) (mm) ($\theta = 0$) | (0, 234.2721, 11.2107) |
| Objective Surface Center ($x_s$, $y_s$, $z_s$) (mm) ($\theta = 0$) | (0, 274.3208, 16.4685) |
| Effective Scanning Distance (mm) | 220 |
| Available Angular Range of Reflecting Surface (deg) | 40 |

Path of light beams as viewed along the z-axis and along the x-axis are similar to those shown in FIGS. 29 and 30.

Results of the simulation are shown in FIGS. 32($a$) (curvature of scanning lines, 32($b$) (curvature of image surface in the feed direction), 32($c$) (curvature of image surface in the scanning direction), and 32($d$) (f$\theta$ error). The maximum curvature of scanning line was $4.2962 \times 10^{-2}$ mm, the maximum curvature of image surface in the feed direction was $-4.4578$ mm, the maximum curvature of image surface in the scanning direction was 0.7152 mm, and the maximum f$\theta$ error was $-7.0998 \times 10^{-3}$ mm.

The postobjective optical scanner in the fourth embodiment comprises the polygonal optical deflector having convex, curved reflecting surfaces each formed of a portion of a curved surface of higher degree represented by a polynominal of even degree not less than fourth degree, and the pseudocylindrical correcting lens disposed between the polygonal optical deflector and the objective surface and having a cylindrical surface having its power on the feed side and a curved surface of even degree having its power on the scanning side. Accordingly, the postobjective optical scanner in the fourth embodiment according to the present invention has a degree of freedom of design greater than that employing a correcting lens having spherical or cylindrical surfaces. Furthermore, since the surface of the pseudocylindrical correcting lens corresponding to the flat surface of the ordinary cylindrical correcting lens is formed of a portion of a curved surface of even degree, the tilt of the polygonal optical deflector can be corrected, and the curvature of image surface and f$\theta$ characteristics can be improved. The combination of the polygonal optical deflector and the pseudocylindrical correcting lens of the present invention achieves the correction of curvature of image surface and f$\theta$ characteristics at a high accuracy.

Fifth Embodiment (FIGS. 33 to 39)

Figure 33:
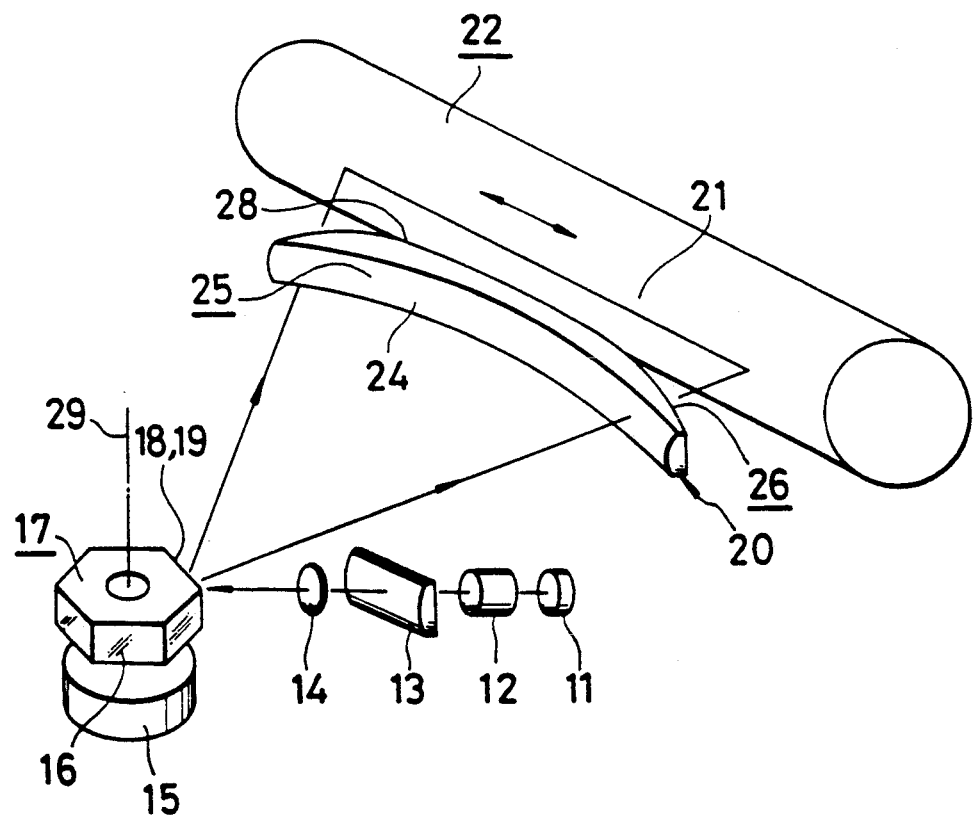
FIG. 33 is a perspective view of a postobjective optical deflector in a fifth embodiment according to the present invention.
Figure 34:
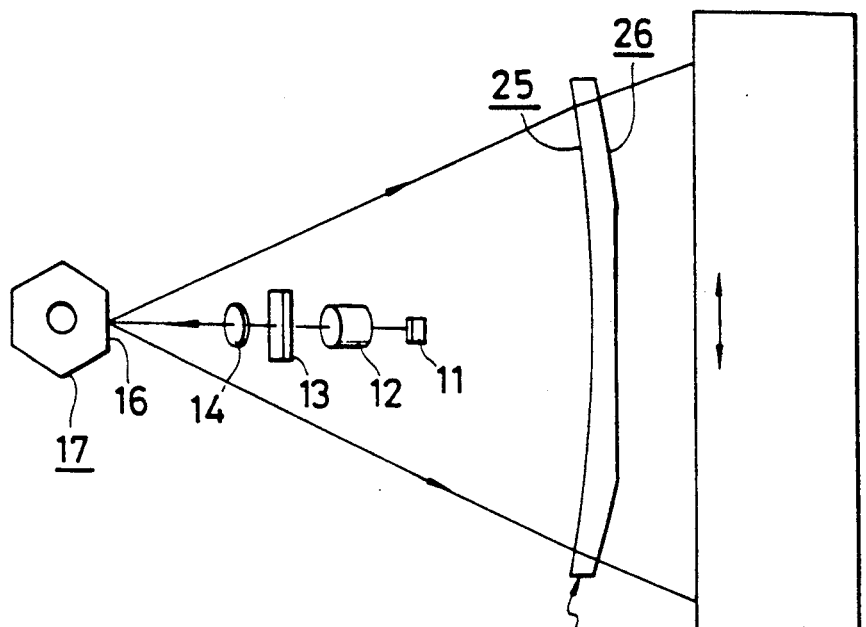
FIG. 34 is a plan view of the postobjective optical deflector of FIG. 33.

Referring to FIG. 33, arranged on the same optical path are a semiconductor laser 11 serving as a light source, a collimating lens 12 to collimate light beams emitted from the semiconductor laser 11, a cylindrical lens 13 and a converging lens 14. A polygonal optical deflector 17 (polygonal rotating mirror) having a plurality of reflecting surfaces 16 is disposed on the optical path and is mounted fixedly on the output shaft of a motor 15. Each reflecting surface 16 is formed of a portion of a spherical surface or a cylindrical surface having its power (power is the refractive power or focusing power of an optical surface) in scanning directions indicated by a double-head arrow.

A correcting lens 20 covering the angular range of a light beam reflected by the polygonal optical deflector 17 is disposed near an objective surface 21 of a cylindrical photosensitive drum 22. Light beams travel through the correcting lens 20 and fall on the objective surface 21 of the photosensitive drum 22.

The correcting lens 20 has a surface 25 of incidence forming one of the surfaces thereof and having its power in both the scanning direction and the feed direction perpendicular to the scanning direction, namely, a rotationally symmetric surface 24 formed of a portion of a rotationally symmetric surface and having a axis 23 of rotational symmetry extending in parallel to the scanning direction, and a surface 26 of departure forming the other surface thereof, having its power in the scanning direction and symmetric with respect to an axis perpendicular to the scanning direction. The surface 26 of departure is a rotationally symmetric curved surface 28 having an axis 27 of rotational symmetry passing the center $O_2$ of a laterally symmetric shape with respect to the scanning direction and perpendicular to the axis 23 of rotational symmetry of the surface 25 of incidence.

Figure 35:
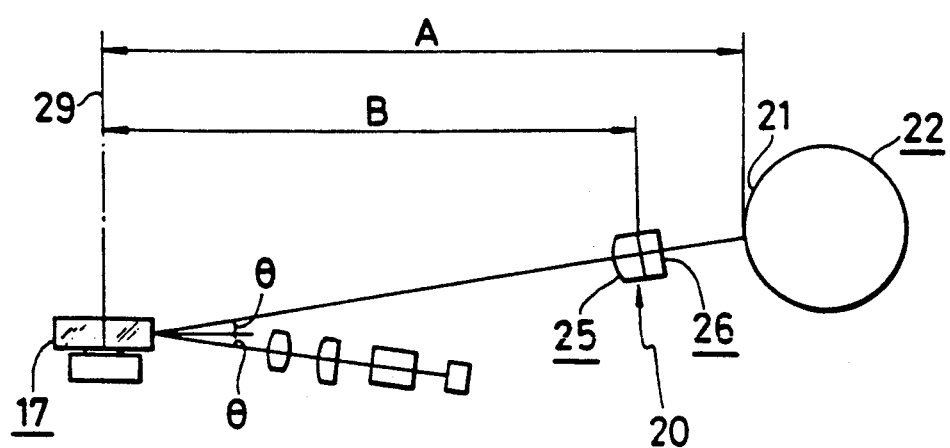
FIG. 35 is a side elevation of the postobjective optical scanner of FIG. 33.

Referring to FIG. 35, the distance between the circumference of the photosensitive drum 22 and the axis 29 of rotation of the polygonal optical deflector 17 is A, and the distance between the axis 29 of rotation of the polygonal optical deflector 17 and the surface 25 of incidence of the correcting lens 20 is B.

The light path on which the semiconductor laser 11, the collimating lens 12, the cylindrical lens 13 and the converging lens 14 are arranged is declined at an angle $\theta = 3.4°$ to a plane perpendicular to the reflecting surface 16 of the polygonal optical deflector 17. The correcting lens 20 and the center of the photosensitive drum 22 are located on an optical path inclined at the same angle $\theta = 3.4°$ to the same plane perpendicular to the reflecting surface 16 of the polygonal optical deflector 17.

Light beams emitted from the semiconductor laser 11 in response to a print signal are collimated in parallel light beams by the collimating lens 12, travel through the cylindrical lens 13 having its power in the feed direction, and the converging lens 14, and then fall on the reflecting surface 16 of the polygonal optical deflector 17. As the polygonal optical deflector 17 rotates, the spot of the parallel light beams passed through the correcting lens 20 moves on the objective surface 21 of the photosensitive drum 22 in the scanning direction for recording.

The optical geometry of the polygonal optical deflector 17 having the reflecting surfaces 16 each formed of a portion of a cylindrical surface 19, the cylindrical lens 13 and the converging lens 14 will be described hereinafter with reference to FIGS. 36 and 37. Each reflecting surface 16 of the polygonal optical deflector 17 is formed of a portion of a cylindrical surface having a circular cross section indicated by a broken line with a radius r and with its center at a point O. The inscribed circle of the polygonal optical deflector 17 has a radius c (=16 mm) and has its center on the axis 29 of rotation of the polygonal optical deflector 17. The axis 29 of rotation of the polygonal optical deflector 17 is parallel to the axis of the cylindrical surface passing the point O.

The cylindrical lens 13 and the converging lens 14 are disposed so that light beams converge on a point S when the light beams are projected in the direction of the axis 29 of rotation, and so that the light beams converge on the reflecting surface 16 when the light beams are projected in the scanning direction. The distance between the axis 29 of rotation of the polygonal optical deflector 17 and the point S is d.

Figure 38:
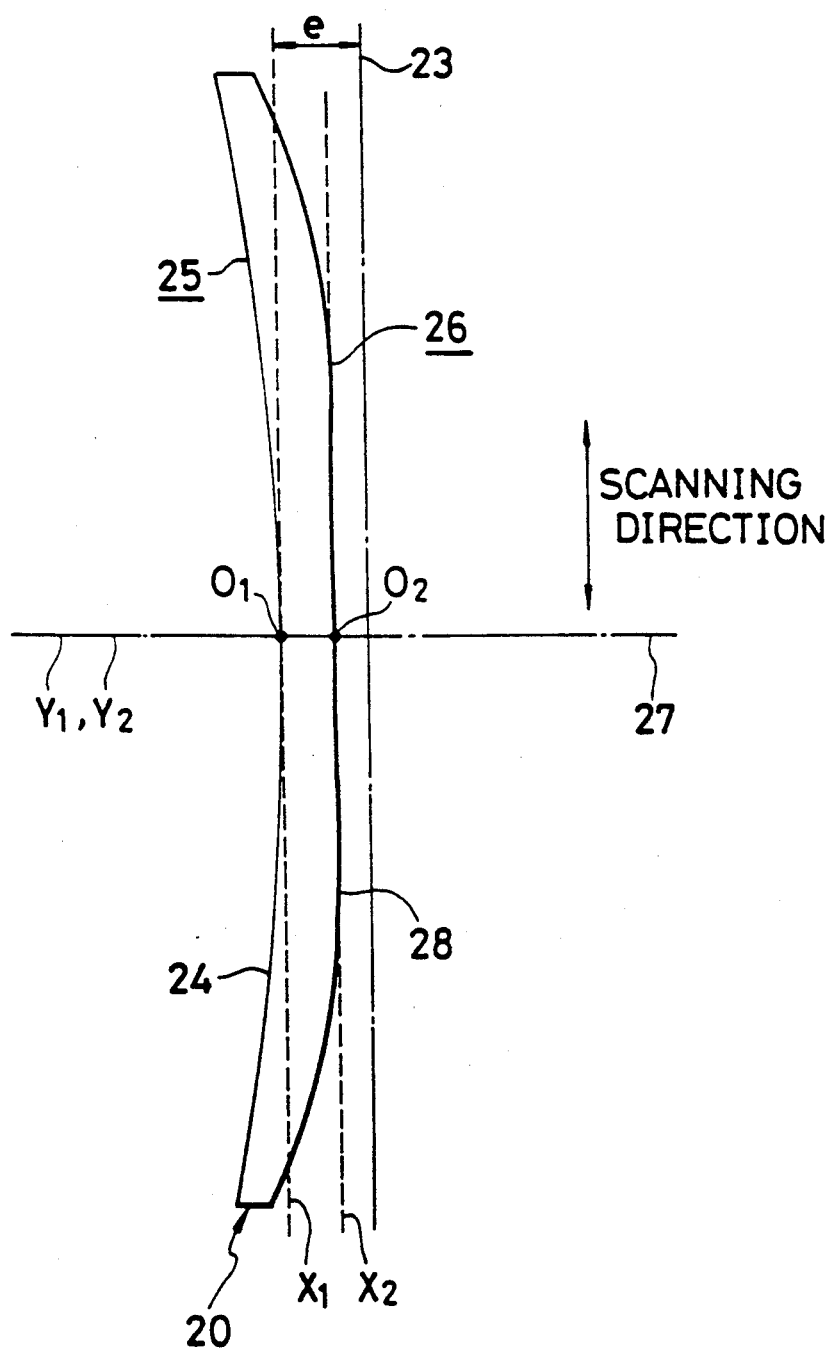
FIG. 38 is a sectional view of a correcting lens taken on a plane parallel to a plane swept by a scanning beam.
Figure 39A:
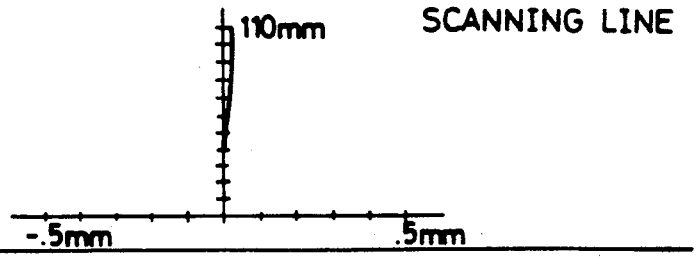
FIGS. 39a to 39d are graphs showing the optical characteristics of the postobjective optical scanner of FIG. 33.
Figure 39B:
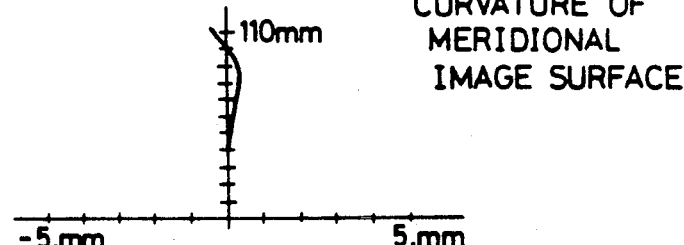
Figure 39C:
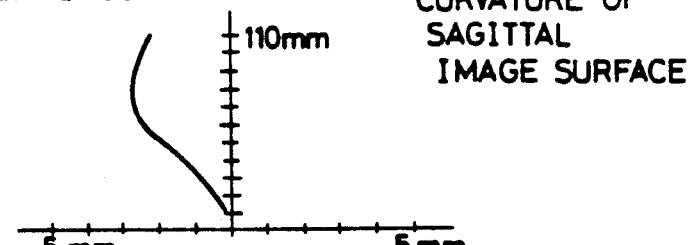
Figure 39D:
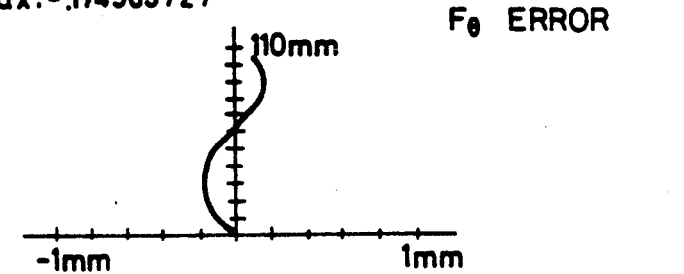

The morphology of the correcting lens 20 will be described with reference to FIG. 38 showing the correcting lens 20 in a section taken on a plane parallel to the scanning direction.

The surface 25 of incidence is formed of a portion of a rotationally symmetric surface 24 having an axis 23 of rotational symmetry. The radius of the surface 25 of incidence at the center $O_1$ thereof is e. On a coordinate system having an origin on the center $O_1$, an $X_1$-axis extending in the scanning direction and a $Y_1$-axis extending perpendicularly to the $X_1$-axis, the contour of the section of the surface 25 of incidence is expressed by a polynominal of degree eight:

$$Y_1 = a_2 X_1^2 + a_4 X_1^4 + a_6 X_1^6 + a_8 X_1^8 \qquad (1)$$

The surface 26 of departure is symmetric with respect to the $Y_1$-axis and is formed of a portion of a rotationally symmetric surface 28 having an axis 27 of rotational symmetry coinciding with the $Y_1$-axis. On a coordinate system having an origin on a center $O_2$, an $X_2$-axis extending in parallel to the scanning direction and a $Y_2$ axis corresponding to the $Y_1$-axis, the contour of the section of the surface 26 of departure is expressed by a polynominal of degree eight:

$$Y_2 = \beta_2 X_2^2 + \beta_4 X_2^4 + \beta_6 X_2^6 + \beta_8 X_2^8 \qquad (2)$$

The correcting lens 20 is formed of an acrylic resin having a refractive index of 1.48. The coefficients of the equations (1) and (2) will be described afterward.

Computer simulation was performed to determine the parameters so that the $f\theta$ characteristics, the curvature of a sagittal image surface, the curvature of a meridional image surface and the curvature of scanning line on the photosensitive drum 22 can be corrected to a practically negligible extent. The scanning line on the photosensitive drum 22 is liable to curve particularly in a skew incidence optical system in which light beams fall on the reflecting surface 16 of the polygonal optical deflector 17 at an angle $\theta$ to a plane perpendicular to the axis 29 of rotation of the polygonal optical deflector 17.

EXAMPLE 1

Values of the parameters selected for the computer simulation were as follows.

| A: | 208.3 mm | B: | 160.8 mm |
|---|---|---|---|
| r: | 135.65 mm | d: | 33.76 mm |
| e: | 16.33 mm | | |
| $a_2$: | $8.610 \times 10^{-4}$ mm$^{-1}$ | $a_4$: | $4.336 \times 10^{-9}$ mm$^{-3}$ |
| $a_6$: | $-5.509 \times 10^{-13}$ mm$^{-5}$ | $a_8$: | $-3.071 \times 10^{-17}$ mm$^{-7}$ |
| $\beta_2$: | $-4.389 \times 10^{-4}$ mm$^{-1}$ | $\beta_4$: | $1.616 \times 10^{-7}$ mm$^{-3}$ |
| $\beta_6$: | $-6.542 \times 10^{-13}$ mm$^{-5}$ | $\beta_8$: | $-2.689 \times 10^{-18}$ mm$^{-7}$ |

In the computer simulation, the effective scanning distance was 220 mm and the corresponding available angular range of the reflecting surface 16 of the polygonal optical deflector 17 was 36°.

The curvature of scanning line, the curvature of meridional image surface, the curvature of sagittal image surface and $f\theta$ obtained through computer simulation are shown in FIG. 39. In graphs shown in FIG. 39, the vertical axes extend along the scanning direction, and the characteristics are measured on the horizontal axes.

$$f\theta \text{ Error} = (\text{Position of scanning spot on the photosensitive drum}) - (\text{Position of linear incidence}) \qquad (3)$$

Position of linear of incidence = (Phase of the polygonal optical deflector) × 220 mm/36°

Figure 36:
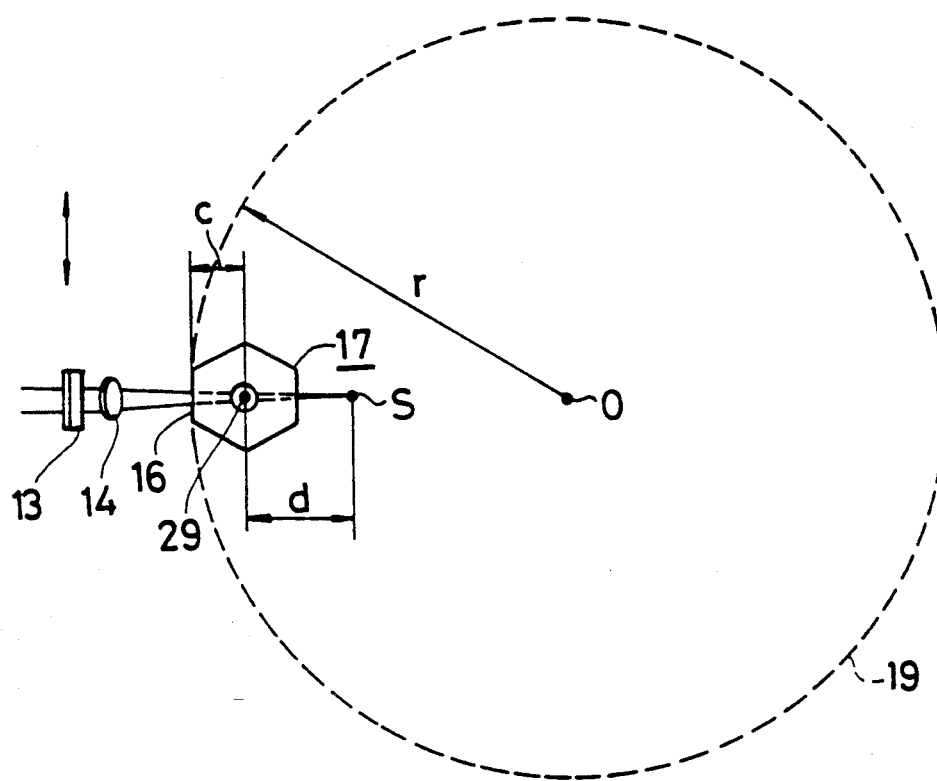
FIGS. 36 and 37 are illustrations of assistance in explaining a polygonal optical deflector having cylindrical reflecting surfaces.
Figure 37:
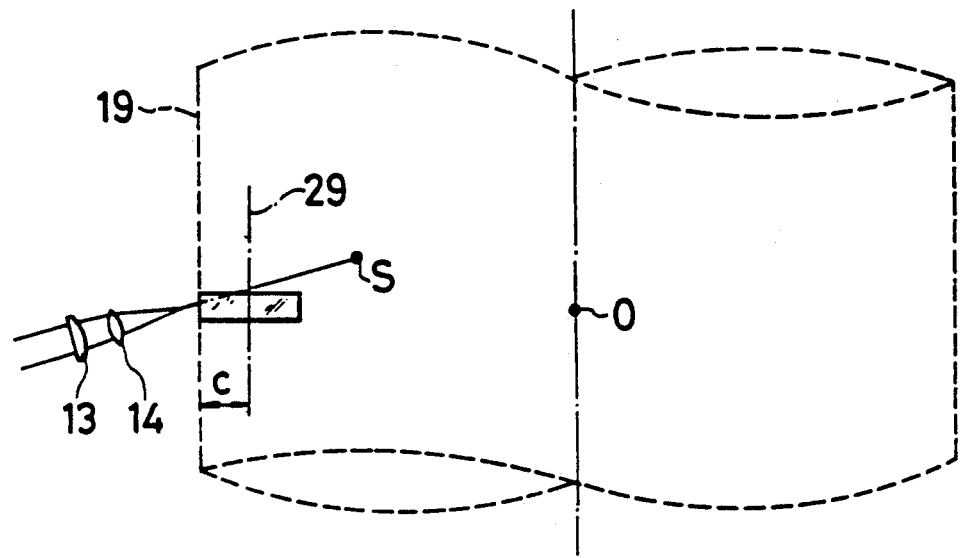

The phase of the polygonal optical deflector 17 is zero when the polygonal optical deflector 17 is in a position as shown in FIG. 36.

EXAMPLE 2

The construction of a postobjective optical scanner is the same as that of the postobjective optical scanner in Example 1. The values of the parameters selected for computer simulation were as follows.

| A: | 210.7 mm | B: | 158.2 mm |
|---|---|---|---|
| r: | 120.30 mm | d: | 29.62 mm |
| e: | 17.63 mm | | |
| $a_2$: | $9.137 \times 10^{-4}$ mm$^{-1}$ | $a_4$: | $7.725 \times 10^{-3}$ |
| $a_6$: | $-5.725 \times 10^{-13}$ mm$^{-5}$ | $a_8$: | $-4.355 \times 10^{-17}$ mm$^{-7}$ |
| $\beta_2$: | $-3.586 \times 10^{-4}$ mm$^{-1}$ | $\beta_4$: | $1.474 \times 10^{-7}$ mm$^{-3}$ |
| $\beta_6$: | $-4.439 \times 10^{-13}$ mm$^{-5}$ | $\beta_8$: | $-1.469 \times 10^{-17}$ mm$^{-7}$ |

The effective scanning distance was 220 mm and the corresponding available angular range of the reflecting surface 16 of the polygonal optical deflector 17 was 36°.

Tabulated in Table 1 are the curvature of the sagittal image surface, the curvature of meridional image surface, linearity of $f\theta$ characteristics and the curvature of scanning line of the Examples 1 and 2 of the fifth embodiment of the present invention and the examples of a postobjective optical scanner employed in a known optical scanning device disclosed in Japanese Patent Laid-open (Kokai) No. 61-156020, obtained through the computer simulation.

In Table 1, simulation Nos. 1, 2 and 3 are for the Examples 1, 2 and 3 of the known postobjective optical scanner, respectively, and simulation Nos. 4 and 5 are for the Examples 1 and 2 of the fifth embodiment of the present invention, respectively. In simulation Nos. 4 and 5, the linearity is represented by the maximum value at a scanning speed in the middle portion of the scanning line.

TABLE 1

| Simulation No. | 1 | 2 | 3 | 4 | 5 |
|---|---|---|---|---|---|
| Curvature of sagittal image surface (mm) | −3.984 | −4.651 | −5.475 | −2.709 | −1.449 |
| Curvature of meridional image surface (mm) | −0.401 | −0.788 | −0.120 | −0.415 | 0.198 |
| Linearity (%) | −10.52 | −8.26 | −8.60 | 1.76 | 2.25 |
| Curvature of scanning line (mm) | — | — | — | 0.028 | 0.030 |

As is obvious from Table 1, the curvature of sagittal image surface and the curvature of meridional image surface in the fifth embodiment of the present invention are approximately ½, and ¼ to 1/5 respectively of those of the examples of the known postobjective optical scanner. Particularly as regards linearity, values for the fifth embodiment of the present invention are not more than 2 to 3%, which needs no additional correcting means such as electrical correcting means. Furthermore, the fifth embodiment is capable of correcting the curvature of scanning line to a practically negligible extent.

Although the Examples 1 and 2 of the fifth embodiment each is provided with one correcting lens 20, the postobjective optical scanner may be provided with a plurality of correcting lenses in view of various manufacturing conditions. For example, the correcting lens 20 may be substituted by two lenses, namely, a first lens having the same surface of incidence as that of the correcting lens 20, and a spherical surface of departure, and a second lens having a spherical surface of incidence, and the same surface of departure as that of the correcting lens 20.

The postobjective optical deflector in the fifth embodiment according to the present invention comprises: the polygonal optical deflector having a plurality of reflecting surfaces each formed of a portion of a spherical surface or a cylindrical surface having its power in the scanning direction; and the correcting lens disposed between the polygonal optical deflector and the objective surface, having a rotationally symmetric curved surface of incidence having a cross section having the shape of an arc of a circle with its center on the axis of rotational symmetry, rotationally symmetric with respect to a plane including the axis of rotation of the polygonal optical deflector and perpendicular to the axis of rotational symmetry and having its power in both the scanning direction and the feed direction, and a surface of departure symmetrical with respect to a plane perpendicular to the scanning direction and having its power in the scanning direction. Therefore, the curvature of image surface in the scanning direction, namely, a sagittal image surface, can be corrected by forming each reflecting surface of the polygonal optical deflector by a portion of a spherical surface of a cylindrical surface having its power in the scanning direction. Furthermore, since the surface of incidence of the correcting lens is formed of a rotationally symmetric curved surface rotationally symmetric with respect to an axis of symmetry parallel to the scanning direction, the power in the feed direction can be varied by varying the curvature of the surface of incidence with respect to the feed direction along the scanning direction, and thereby the curvature of the image surface in the feed direction, namely, the meridional image surface, can be corrected. Still further, forming the surface of departure of the correcting lens in a curved surface having its power in the scanning direction enables the correction of $f\theta$ characteristics and the further accurate correction of the sagittal image surface.

Thus, the curvature of the sagittal image surface, the curvature of the meridional image surface and $f\theta$ characteristics can be corrected by the combined correcting effects of the reflecting surfaces of the polygonal optical deflector, and the surfaces of incidence and departure of the correcting lens. Furthermore, the correction of $f\theta$ characteristics, which has been a significant problem, can be achieved by optical means without requiring any electrical means, so that the postobjective optical scanner of the present invention has high performance, and is simple in construction and inexpensive.

Sixth Embodiment (FIGS. 40 to 46)

EXAMPLE 1

Figure 40:
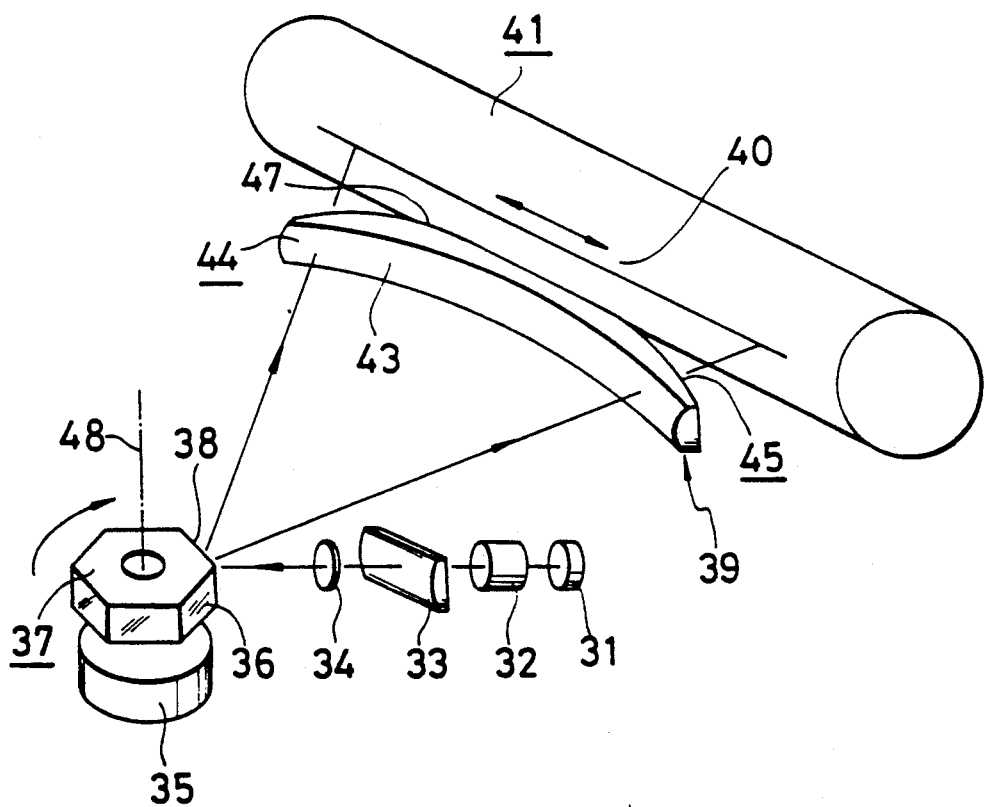
FIG. 40 is a perspective view of a postobjective optical scanner in a sixth embodiment according to the present invention.
Figure 41:
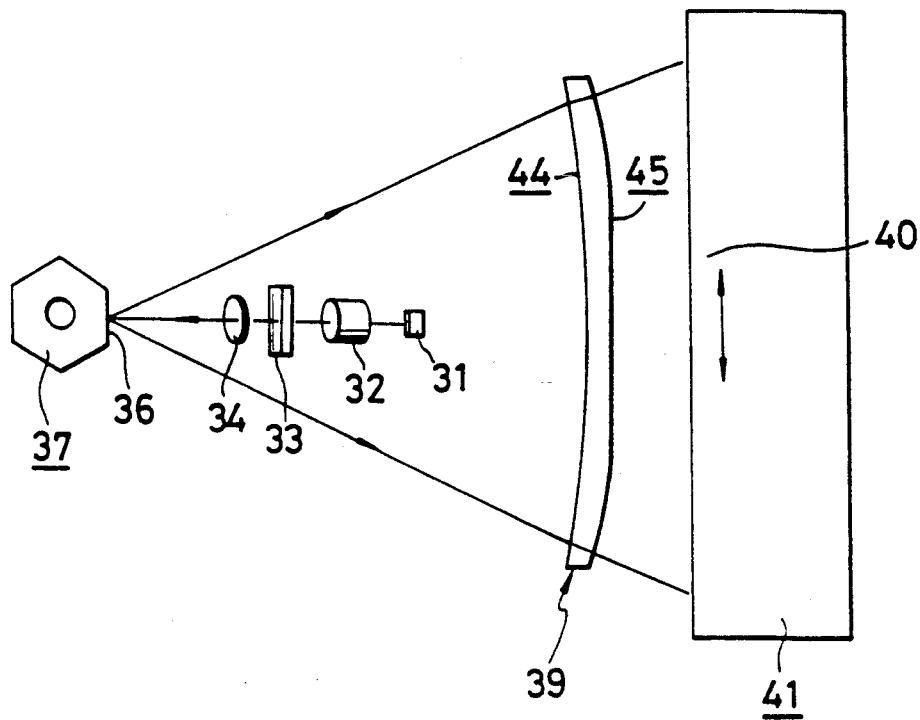
FIG. 41 is a plan view of the postobjective optical deflector of FIG. 40.

Referring to FIGS. 40 and 41, arranged on the same optical path are a semiconductor laser 31 serving as a light source, a collimating lens 32 to collimate light beams, a cylindrical lens 33 and a converging lens 34. A polygonal optical deflector (polygonal rotating mirror) 37 having a plurality of reflecting surfaces 36 is disposed on the optical path and is mounted fixedly on the output shaft of a motor 35. Each reflecting surface 36 is a curved surface 38 varying in curvature from position to position thereon.

A correcting lens 39 is disposed so as to cover the angular range of light beams reflected by the polygonal optical deflector 37, and a cylindrical photosensitive drum 41 having an objective surface 40 on which light beams transmitted through the correcting lens 39 fall is disposed behind the correcting lens 39.

The correcting lens 39 has its power (refractive power or focusing power) in both the scanning direction indicated by a double-head arrow and the feed direction perpendicular to the scanning direction. The correcting lens 39 has a surface 44 of incidence formed of a portion of a rotationally symmetric curved surface 43 having an axis 44 of symmetry parallel to the scanning direction, and a surface 45 of departure having its power in the scanning direction and symmetric with respect to an axis perpendicular to the scanning direction. The surface 45 of departure is formed of a portion of a rotationally symmetric curved surface 47 having an axis 46 of rotational symmetry passing the center $O_2$ of a laterally symmetric shape with respect to the scanning direction and perpendicular to the axis 42 of rotational symmetry of the surface 44 of incidence.

Figure 42:
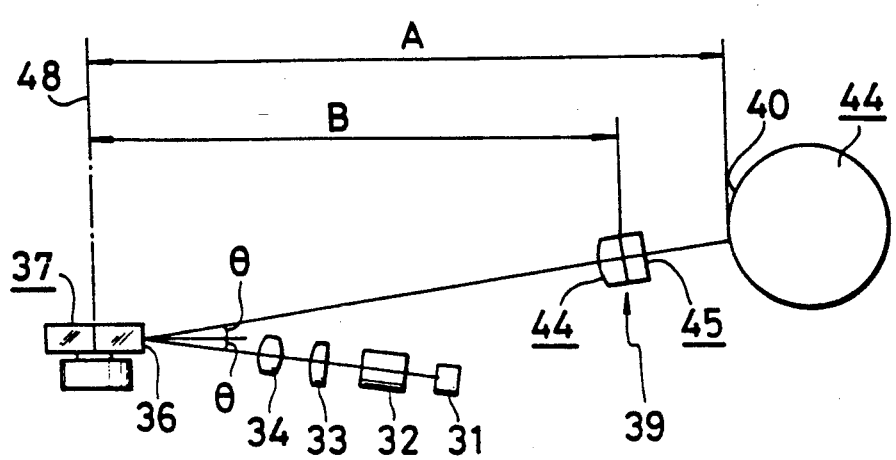
FIG. 42 is a side elevation of the postobjective optical scanner of FIG. 40.

Referring to FIG. 42, the distance between the objective surface 40 and the axis 48 of rotation of the polygonal optical deflector 37 is A, and the distance between the axis 48 of rotation of the polygonal optical deflector 37 and the surface 44 of incidence of the correcting lens 39 is B.

The light path on which the semiconductor laser 31, the collimating lens 32, the cylindrical lens 33 and the converging lens 34 are arranged is declined at an angle $\theta = 3.4°$ to a plane perpendicular to the reflecting surface 36 of the polygonal optical deflector 37. The correcting lens 39 and the center of the photosensitive drum 41 are located on an optical path inclined at the same angle $\theta = 3.4°$ to the same plane perpendicular to the reflecting surface 36 of the polygonal optical deflector 37.

Light beams emitted from the semiconductor laser 31 in response to a print signal are collimated in parallel light beams by the collimating lens 32, travel through the cylindrical lens 33 having its power in the feed direction, and the converging lens 34, and then fall on the reflecting surface 36 of the polygonal optical deflector 37. As the polygonal optical deflector 37 rotates, the spot of the parallel light beams passed through the correcting lens 39 moves on the objective surface 40 of the photosensitive drum 41 in the scanning direction for recording.

The optical geometry of the polygonal optical deflector 37 having the reflecting surface 36 each formed of a portion of an elliptic cylinder having an elliptic contour 49, the cylindrical lens 33 and the converging lens 14 will be described hereinafter with reference to FIGS. 43 and 44. The elliptic contour 49 has its center at a point O, a minor axis of a in length, and a major axis of b in length. Each reflecting surface 36 of the polygonal optical deflector 37 is formed of a portion corresponding to the minor axis of a in length of the elliptic cylinder. The axis 48 of rotation of the polygonal optical deflector 37 passes the center of the inscribed circle having a radius of c (= 16 mm) thereof and is parallel to the center axis of the elliptic cylinder passing the point O.

The cylindrical lens 33 and the converging lens 34 are disposed so that light beams converge on a point S when the light beams are projected in the direction of the axis 48 of the polygonal optical deflector 37, and so that the light beams converge on the reflecting surface 36 of the polygonal optical deflector 37 when the light beams are projected in the scanning direction. The distance between the axis 48 of rotation of the polygonal optical deflector 37 and the point S is d.

Figure 45:
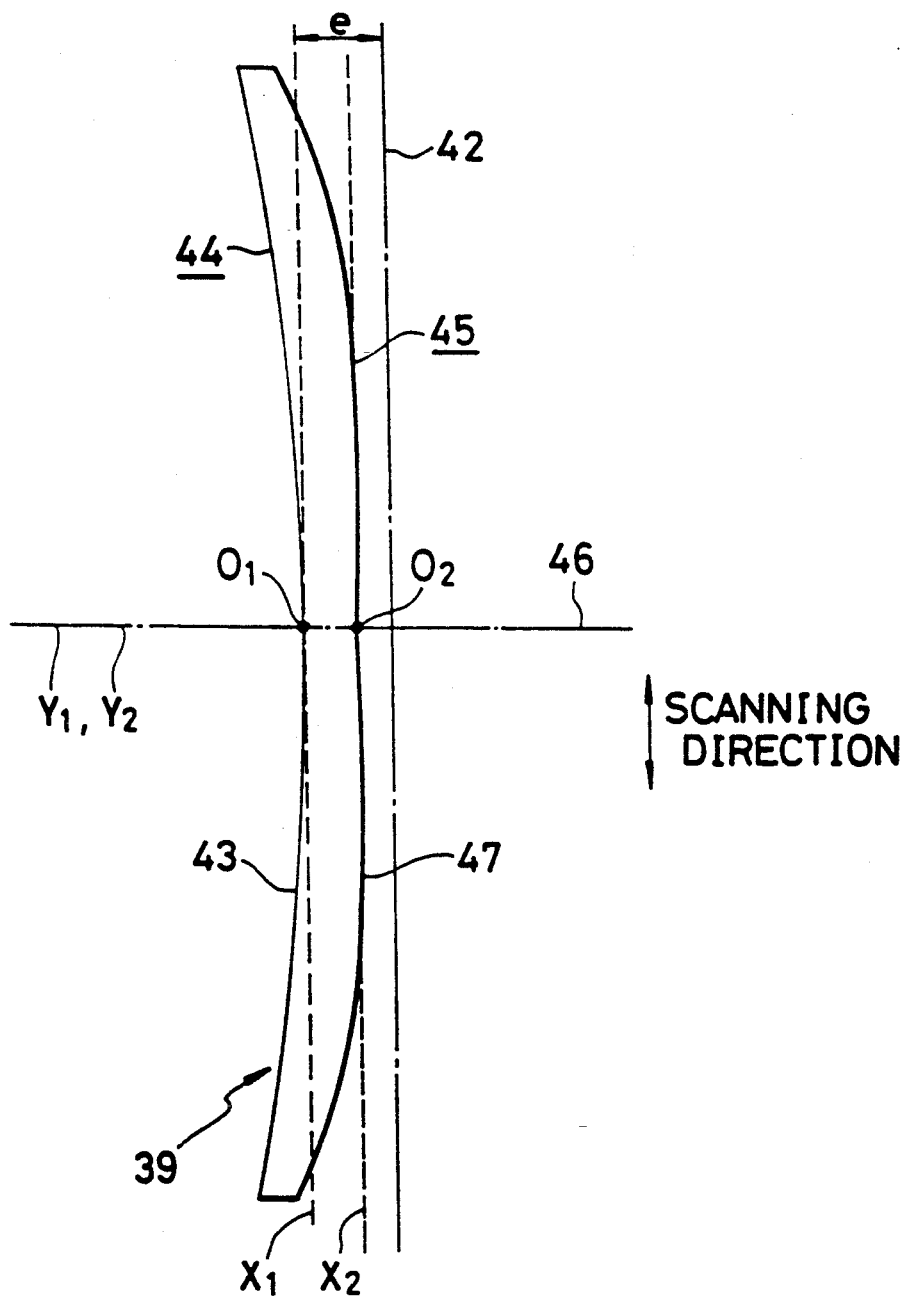
FIG. 45 is a sectional view of a correcting lens taken on a plane parallel to a plane swept by a scanning beam.
Figure 46A:
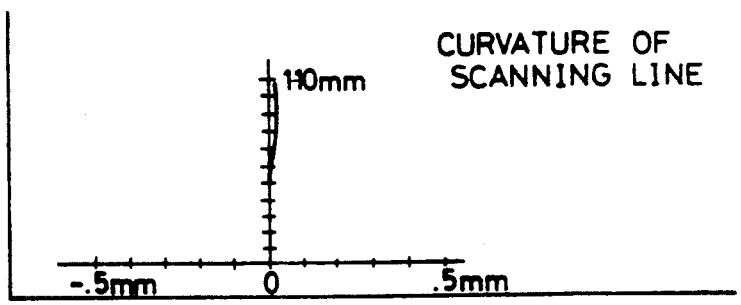
FIGS. 46a to 46d are graphs showing the optical characteristics of the postobjective optical scanner of FIG. 40.
Figure 46B:
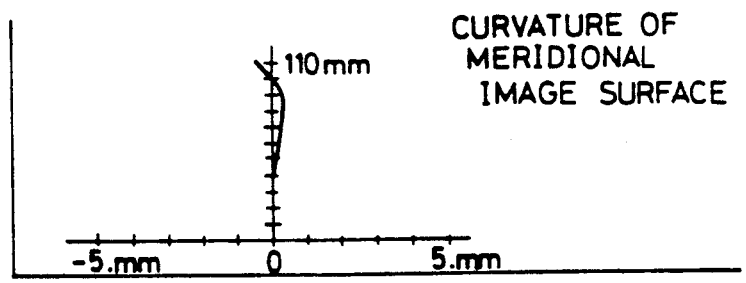
Figure 46C:
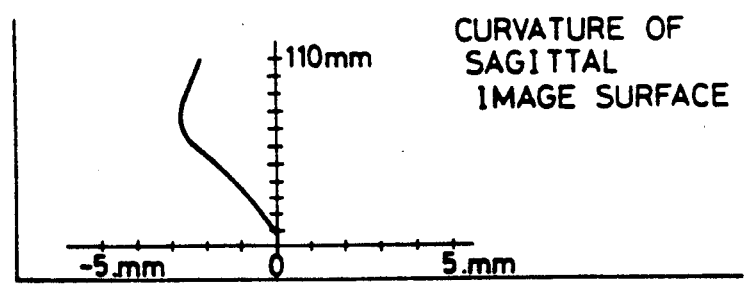
Figure 46D:
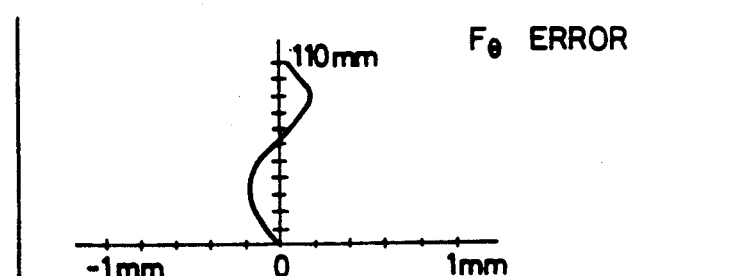

The morphology of the correcting lens 39 will be described hereinafter with reference to FIG. 45 showing the correcting lens 39 in a cross section taken on a plane parallel to the scanning direction The surface 44 of incidence is formed of a portion of a rotationally symmetric curved surface 43 having an axis 42 of rotational symmetry. The radius of the rotationally symmetric curved surface at the center $O_1$ is e. On a coordinate system having an origin on the center $O_1$, an $X_1$-axis extending in the scanning direction and a $Y_1$-axis extending perpendicularly to the $X_1$-axis, the contour of the surface 44 of incidence 44 is expressed by a polynominal of degree eight:

$$Y_1 = a_2 X_1^2 + a_4 X_1^4 + a_6 X_1^6 + a_8 X_1^8 \qquad (4)$$

The surface 45 of departure is symmetric with respect to the $Y_1$-axis and is formed of a portion of a rotationally symmetric surface having an axis 46 of rotational symmetry coinciding with the $Y_1$-axis. On a coordinate system having an origin on a center $O_2$, an $X_2$-axis extending in parallel to the scanning direction, and a $Y_2$-axis coinciding with the $Y_1$-axis, the contour of the central section of the surface 44 of incidence is expressed by a polynominal of degree eight:

$$Y_2 = \beta_2 X_2^2 + \beta_4 X_2^4 + \beta_6 X_2^6 + \beta_8 X_2^8 \qquad (5)$$

The correcting lens 39 is formed of an acrylic resin having a refractive index of 1.48. The coefficients of the equations (4) and (5) will be described afterward.

Computer simulation was performed to determine the parameters so that the f$\theta$ characteristics, the curvature of a sagittal image surface, the curvature of a meridional image surface and the curvature of scanning line on the photosensitive drum 41 can be corrected to a practically negligible extent. The scanning line on the photosensitive drum 41 is liable to curve particularly in a skew incidence optical system in which light beams fall on the reflecting surface 36 of the polygonal optical deflector 37 at an angle $\theta$, namely, an angle other than a right angle, to a plane perpendicular to the axis 29 of rotation of the polygonal optical deflector 37. Values of the parameters selected for the computer simulation were as follows.

| A: | 208.3 mm | B: | 160.8 mm |
|---|---|---|---|
| a: | 116.15 mm | b: | 125.52 mm |
| d: | 33.76 mm | e: | 16.33 mm |
| $a_2$: | $8.610 \times 10^{-4}$ mm$^{-1}$ | $a_4$: | $4.336 \times 10^{-9}$ mm$^{-3}$ |
| $a_6$: | $-5.509 \times 10^{-13}$ mm$^{-5}$ | $a_8$: | $-3.071 \times 10^{-17}$ mm$^{-7}$ |
| $\beta_2$: | $-4.389 \times 10^{-4}$ mm$^{-1}$ | $\beta_4$: | $1.616 \times 10^{-7}$ mm$^{-3}$ |
| $\beta_6$: | $-6.542 \times 10^{-13}$ mm$^{-5}$ | $\beta_8$: | $-2.689 \times 10^{-18}$ mm$^{-7}$ |

In the computer simulation, the effective scanning distance was 220 mm and the corresponding available angular range of the reflecting surface 36 of the polygonal optical deflector 37 was 36°.

The curvature of scanning line, the curvature of the meridional image surface, the curvature of the sagittal image surface and f$\theta$ error obtained through the computer simulation are shown in FIG. 46. In graphs shown in FIG. 46, the vertical axes extend along the scanning direction, and the characteristics are measured on the horizontal axes.

f$\theta$ Error = (Position of scanning spot on the photosensitive drum) − (Position of linear of incidence) \qquad (6)

Position of linear incidence = (Phase of the polygonal optical deflector) × 220 mm/36°

Figure 43:
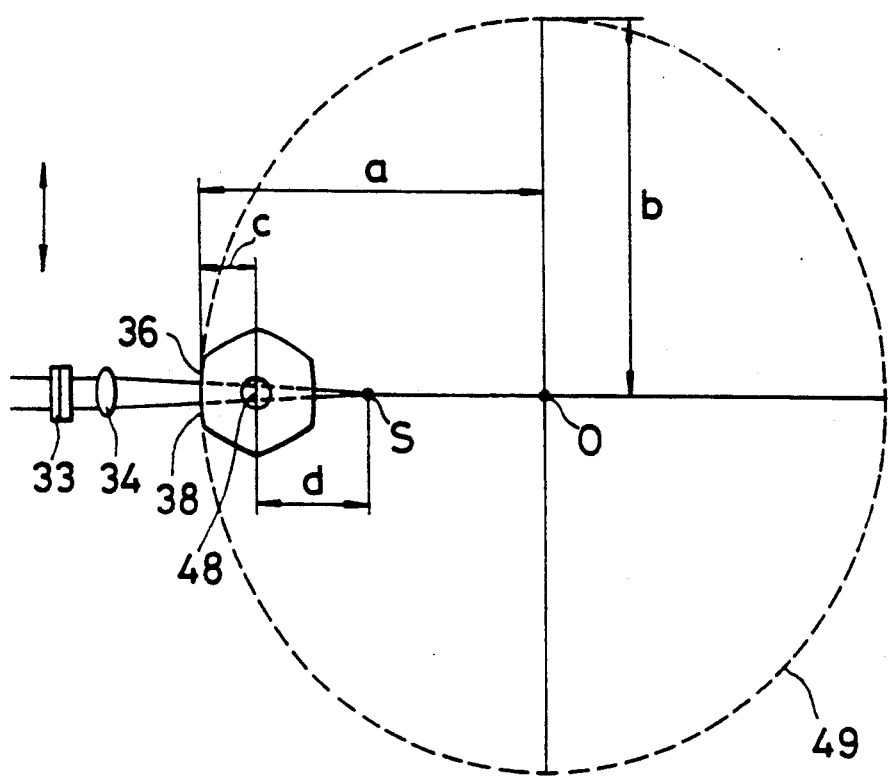
FIGS. 43 and 44 are illustrations of assistance in explaining a polygonal optical deflector having cylindrical reflecting surfaces.
Figure 44:
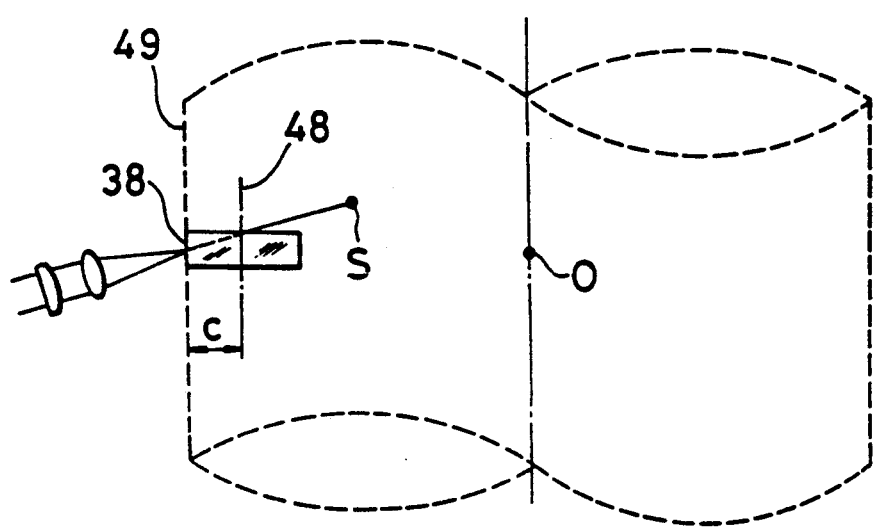

The phase of the polygonal optical deflector 37 is zero when the polygonal optical deflector 37 is in a position as shown in FIG. 43.

EXAMPLE 2

The construction of a postobjective optical scanner is the same as that of the postobjective optical scanner in Example 1. The values of the parameters selected for computer simulation were as follows.

| A: | 210.7 mm | B: | 158.2 mm |
|---|---|---|---|
| a: | 68.84 mm | b: | 91.00 mm |
| d: | 29.62 mm | e: | 17.63 mm |
| $a_2$: | $9.137 \times 10^{-4}$ mm$^{-1}$ | $a_4$: | $7.725 \times 10^{-9}$ mm$^{-3}$ |
| $a_6$: | $-5.725 \times 10^{-13}$ | $a_8$: | $-4.355 \times 10^{-17}$ mm$^{-7}$ |
| $\beta_2$: | $-3.586 \times 10^{-4}$ mm$^{-1}$ | $\beta_4$: | $1.474 \times 10^{-7}$ mm$^{-3}$ |
| $\beta_6$: | $-4.439 \times 10^{-13}$ mm$^{-5}$ | $\beta_8$: | $-1.469 \times 10^{-17}$ mm$^{-7}$ |

In this example also, the effective scanning distance was 220 mm and the corresponding available angular range of the reflecting surface of the polygonal optical deflector 37 was 36°.

Tabulated in Table 2 are the curvature of the sagittal image surface, the curvature of the meridional image surface, the linearity of f$\theta$ characteristics and the curvature of scanning line of the Examples 1 and 2 of the sixth embodiment of the present invention and the examples of a postobjective optical scanner employed in the known optical scanning device disclosed in Japanese Patent Laid-open (Kokai) No. 61-156020, obtained through computer simulation.

TABLE 2

| Simulation No. | 1 | 2 | 3 | 4 | 5 |
|---|---|---|---|---|---|
| Curvature of sagittal image surface (mm) | −3.984 | −4.651 | −5.475 | −2.624 | 1.027 |
| Curvature of meridional image surface (mm) | −0.401 | −0.788 | −0.120 | −0.415 | −0.196 |
| Linearity (%) | −10.52 | −8.26 | −8.60 | 1.76 | 2.23 |
| Curvature of scanning line (mm) | — | — | — | 0.028 | 0.030 |

In Table 2, simulation Nos. 1, 2 and 3 are for the Examples 1, 2 and 3 of the known postobjective optical deflector, respectively, and simulation Nos. 4 and 5 are for the Examples 1 and 2 of the sixth embodiment, respectively. In simulation Nos. 4 and 5, the linearity is represented by the maximum value at a scanning speed in the middle portion of the scanning line.

As is obvious from Table 2, the curvature of sagittal image surface and the curvature of meridional image surface in the sixth embodiment of the present invention are approximately ½, and ¼ to 1/5 respectively of those of the examples of the known postobjective optical scanner. Particularly as regards linearity, values for the sixth embodiment of the present invention are not more than 2 to 3%, which needs no additional correcting means such as electrical correcting means. Furthermore, the sixth embodiment is capable of correcting the curvature of scanning line to a practically negligible extent.

Although the Examples 1 and 2 of the sixth embodiment each is provided with one correcting lens 39, the postobjective optical scanner may be provided with a plurality of correcting lenses in view of various manufacturing conditions. For example, the correcting lens 39 may be substituted by two lenses, namely, a first lens having the same surface of incidence as that of the correcting lens 39, and a spherical surface of departure, and a second lens having a spherical surface of incidence, and the same surface of departure as that of the correcting lens 39.

The postobjective optical scanner in the sixth embodiment according to the present invention comprises: the polygonal optical deflector having a plurality of reflecting surfaces each formed of a curved surface varying in curvature from position to position thereon; and the correcting lens disposed between the polygonal optical deflector and the objective surface, having a rotationally symmetric curved surface of incidence having a cross section having the shape of an arc of a circle with its center on the axis of rotational symmetry, rotationally symmetric with respect to a plane including the axis of rotation of the polygonal optical deflector and perpendicular to the axis of rotational symmetry and having its power in both the scanning direction and the feed direction, and a surface of departure symmetrical with respect to a plane perpendicular to the scanning direction and having its power in the scanning direction. Thus, the employment of the polygonal optical deflector having reflecting surfaces each formed of a curved surface varying in curvature from position to position thereon enables the postobjective optical scanner to correct the curvature of the image surface in the scanning direction, namely, the sagittal image surface more effectively than the postobjective optical scanner employing a polygonal optical deflector having reflecting surfaces each formed of a portion of a spherical surface or a cylindrical surface having a fixed curvature. Furthermore, since the surface of incidence of the correcting lens is formed of a rotationally symmetric curved surface rotationally symmetric with respect to an axis of symmetry parallel to the scanning direction, the power in the feed direction can be varied by varying the curvature of the surface of incidence with respect to the feed direction along the scanning direction, and thereby the curvature of the image surface in the feed direction, namely, the meridional image surface can be corrected. Still further, forming the surface of departure of the correcting lens in a curved surface having power in the scanning direction enables the correction of fθ characteristics and the further accurate correction of the sagittal image surface.

Thus, the curvature of the sagittal image surface, the curvature of the meridional image surface and fθ characteristics can be corrected by the combined correcting effects of the reflecting surfaces of the polygonal optical deflector, and the surfaces of incidence and departure of the correcting lens. Furthermore, the correction of fθ characteristics, which has been a significant problem, can be achieved by optical means without requiring any electrical means, so that the postobjective optical scanner of the present invention has high performance, and is simple in construction and inexpensive.

What is claimed is:

1. A postobjective optical scanner which scans an objective surface by a light beam emitted from a semiconductor laser, comprising:

a polygonal optical deflector for reflecting the light beam emitted from the semiconductor laser toward the objective surface, having a plurality of reflecting surfaces each being a curved surface varying in curvature from position to position thereon; and a correcting lens disposed between the polygonal optical deflector and the objective surface on an optical path; and having a rotationally symmetrical curved surface of incidence having a cross section having the shape of an arc of a circle with its center on the axis of rotational symmetry, rotationally symmetric with respect to a plane including the axis of rotation of the polygonal optical deflector and perpendicular to the axis of rotational symmetry and having its power in both the feed direction and the scanning direction, and a surface of departure symmetrical with respect to a plane perpendicular to the scanning direction and having its power in the scanning direction.

2. A postobjective optical scanner according to claim 1, wherein the surface of incidence of said correcting lens is a portion of a curved surface represented by a polynominal of even degree within a rotationally symmetric curved surface having a sectional contour having the shape of an arc of a circle drawn in the feed direction, and rotationally symmetric with respect to the axis of rotational symmetry.

3. A postobjective optical scanner according to claim 1, wherein the surface of departure of said correcting lens is a portion of a rotationally symmetric curved surface rotationally symmetric with respect to an axis of rotational symmetry passing the center of the correcting lens and extending perpendicularly to the axis of rotational symmetry of the surface of incidence.

4. A postobjective optical scanner according to claim 1, wherein the surface of departure of said correcting lens is a curved surface represented by a polynominal of even degree within a rotationally symmetric curved surface including the axis of rotational symmetry of the surface of departure.

* * * * *